(12) United States Patent
Shen et al.

(10) Patent No.: US 8,824,368 B2
(45) Date of Patent: Sep. 2, 2014

(54) METHOD AND TERMINAL FOR SENDING SCAN REPORT BASED ON MULTI-CARRIER SYSTEM

(75) Inventors: Xiaoqin Shen, Shenzhen (CN); Hao Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 211 days.

(21) Appl. No.: 13/171,742

(22) Filed: Jun. 29, 2011

(65) Prior Publication Data

US 2011/0255478 A1    Oct. 20, 2011

Related U.S. Application Data

(63) Continuation of application No. PCT/CN2009/074588, filed on Oct. 23, 2009.

(30) Foreign Application Priority Data

Jan. 22, 2009   (CN) .......................... 2009 1 0002889

(51) Int. Cl.
*H04W 24/00* (2009.01)
*H04W 24/10* (2009.01)
*H04W 48/16* (2009.01)

(52) U.S. Cl.
CPC .............. *H04W 24/10* (2013.01); *H04W 48/16* (2013.01)
USPC ......................................................... 370/328

(58) Field of Classification Search
CPC ............ H04W 24/10; H04W 36/0083; H04W 72/0453; H04L 5/001
USPC .......................... 370/310, 328, 329, 331, 332
See application file for complete search history.

(56) References Cited

U.S. PATENT DOCUMENTS

| | | | |
|---|---|---|---|
| 6,101,383 A * | 8/2000 | Poon | 455/425 |
| 6,574,456 B2 * | 6/2003 | Hamabe | 455/63.3 |
| 6,591,100 B1 * | 7/2003 | Dent | 455/434 |
| 7,245,636 B1 * | 7/2007 | Hans et al. | 370/474 |
| 7,706,330 B2 * | 4/2010 | Sartori et al. | 370/333 |

(Continued)

FOREIGN PATENT DOCUMENTS

| | | | | |
|---|---|---|---|---|
| JP | 2008-501283 | 1/2008 | | H04Q 7/22 |
| JP | 2008-502204 | 2/2008 | | H04Q 7/22 |
| WO | WO2008/029700 A1 | 3/2008 | | H04B 7/26 |

OTHER PUBLICATIONS

Falconer, David, "Multipath Measurements and Modelling for Fixed Broadband Wireless Systems in a Residential Environment", IEEE 802.16 Broadband Wireless Access Working Group, IEEE 802.16te-YY/nn, Feb. 6, 2000, pp. 0-14.

*Primary Examiner* — Chi Pham
*Assistant Examiner* — Robert Lopata

(57) ABSTRACT

A method and terminal for sending a scan report based on a multi-carrier system are provided. The method comprises the following steps: a terminal acquiring a first configuration parameter of carrier(s) indicated by a base station and a second configuration parameter needed for the terminal to send a scan report, wherein the carrier(s) indicated by the base station is one of or a plurality of carriers of the base station and/or a neighboring base station of the base station; and the terminal scanning the carrier(s) indicated by the base station according to the first configuration parameter, generating a scan report, and sending the scan report to the base station according to the second configuration parameter.

14 Claims, 6 Drawing Sheets

(56) References Cited

U.S. PATENT DOCUMENTS

| | | | |
|---|---|---|---|
| 8,401,541 B2* | 3/2013 | Jung et al. | 455/422.1 |
| 8,520,635 B2* | 8/2013 | Zhang et al. | 370/331 |
| 2001/0055297 A1* | 12/2001 | Benveniste | 370/349 |
| 2002/0022484 A1* | 2/2002 | Dickey | 455/446 |
| 2008/0058018 A1* | 3/2008 | Scheinert | 455/562.1 |
| 2008/0253336 A1 | 10/2008 | Parkvall et al. | 370/335 |
| 2009/0310563 A1* | 12/2009 | Chou et al. | 370/331 |
| 2010/0062765 A1* | 3/2010 | Jung et al. | 455/434 |
| 2010/0157923 A1* | 6/2010 | Jung et al. | 370/329 |
| 2010/0220674 A1* | 9/2010 | Fu | 370/329 |
| 2010/0272051 A1* | 10/2010 | Fu et al. | 370/329 |
| 2011/0149912 A1* | 6/2011 | Jung et al. | 370/331 |
| 2011/0159903 A1* | 6/2011 | Yuk et al. | 455/507 |
| 2011/0170519 A1* | 7/2011 | Zhang et al. | 370/331 |

\* cited by examiner

METHOD AND TERMINAL FOR SENDING SCAN REPORT BASED ON MULTI-CARRIER SYSTEM

This is a continuation of International Application PCT/CN2009/074588, with an International Filing Date of Oct. 23, 2009, which claims priority to Chinese Application No. 200910002889.6, filed Jan. 22, 2009, each of which is incorporated by reference.

FIELD OF THE INVENTION

The present invention relates to communication field, and in particular, to a method and a terminal for sending a scan report based on a multi-carrier system.

BACKGROUND OF THE INVENTION

In the related technologies, in order to meet the requirement of high rate, the concept of multi-carrier is introduced into the system.

The base station can be configured with a plurality of carriers that can be classified into two types: one type is a fully-configured carrier, and the other type is a partially-configured carrier, wherein the fully-configured carrier includes all indispensable system side information such as synchronization channel, control channel and the like, and the partially-configured carrier may only include a data transport channel or only include some indispensable control messages. Compared with the fully-configured carrier, the partially-configured carrier may not include the synchronization channel.

At the terminal side, the carriers can be classified into a primary carrier and a secondary carrier.

In the above, the primary carrier necessarily is a fully-configured carrier mainly used for the interaction of the control messages and/or data between the base station and the terminal, and also used for performing the interaction of service processing, and Physics (PHY for short) control information or Media Access Control (MAC for short) information; in addition, the primary carrier also can be used for completing part of the terminal control functions, such as network access. It should be indicated that each terminal has one and only one primary carrier in one cell.

The secondary carrier, which can be either a fully-configured carrier or a partially-configured carrier, is an additional carrier for transmitting services for the terminal and is mainly used for the data interaction, wherein the secondary carrier also can carry the control signaling that supports the multi-carrier operation. One terminal can have one or more secondary carriers and may not have any secondary carrier.

In the mobile communication system, when the terminal moves to the edge of the base station, if the signal condition of the original serving base station declines, and it cannot continue to provide services for the terminal, the terminal then needs to switch to another base station to maintain the continuity of the services. This kind of switch is an inter-base station switch.

In the multi-carrier system, as one base station is provided with a plurality of carriers, when the load of the carrier (serving carrier) currently used by the terminal is too large so that a Quality of Service (QoS for short) is caused to decline or the signal strength of the serving carrier decreases so that the terminal needs to search for the carrier with better strength, the terminal can switch onto another carrier in the base station to perform the data transmission. This kind of switch is an intra-base station switch.

In a single-carrier system, the base station merely has one carrier and will broadcast the information of this carrier through the broadcasting information. However, in the multi-carrier system, one base station is configured with a plurality of carriers that are carried on different frequencies, therefore, when the terminal performs the intra- or inter-base station switch, the plurality of carriers should be scanned according to the information such as frequency and bandwidth of each carrier. But when the scan is completed, the terminal currently does not have corresponding solution for sending a multi-carrier scan report to the base station.

SUMMARY OF THE INVENTION

The present invention is provided upon considering the problem that the terminal in the multi-carrier system does not have corresponding solution for sending a multi-carrier scan report to the base station. Thus, the main object of the present invention lies in providing an improved solution for sending a scan report based on a multi-carrier system so as to solve the above problem in the related technologies.

In order to achieve the above object, according to one aspect of the present invention, a method for sending a scan report based on a multi-carrier system is provided.

The method for sending a scan report based on a multi-carrier system according to the present invention comprises: a terminal acquiring a first configuration parameter of carrier(s) indicated by a base station and a second configuration parameter needed for the terminal to send a scan report, wherein the carrier(s) indicated by the base station is one of or a plurality of carriers of the base station and/or a neighboring base station of the base station; and the terminal scanning the carrier(s) indicated by the base station according to the first configuration parameter, generating a scan report, and sending the scan report to the base station according to the second configuration parameter.

Preferably, the carrier(s) indicated by the base station is fully-configured carrier(s).

In addition, before the terminal acquires the first configuration parameter and the second configuration parameter, the method further comprises: the base station determining the carrier(s) indicated by the base station that the terminal needs to scan; the base station setting the first configuration parameter of the carrier(s) indicated by the base station; the base station setting the second configuration parameter needed for the terminal to send the scan report; and the base station sending the first configuration parameter and the second configuration parameter to the terminal.

Preferably, the first configuration parameter comprises at least one of the following: identification(s) of the carrier(s) indicated by the base station, frequency(s) of the carrier(s) indicated by the base station, and bandwidth(s) of the carrier(s) indicated by the base station.

Preferably, the second configuration parameter comprises at least one of the following: an identification of whether to send the scan report, and a mode of sending the scan report.

Preferably, the scan report comprises information of carrier(s) scanned by the terminal, wherein the information comprises at least one of the following: the number of the scanned carrier(s), identification(s) of the scanned carrier(s), frequency(s) of the scanned carriers, and bandwidth(s) of the scanned carrier(s).

In order to achieve the above object, according to the other aspect of the present invention, a terminal is provided.

The terminal according to the present invention comprises: an acquiring module, configured to acquire a first configuration parameter of carrier(s) indicated by the base station and a second configuration parameter needed for the terminal to send a scan report, wherein the carrier(s) indicated by the base station is one of or a plurality of the carriers of the base station and/or a neighboring base station of the base station; a scanning module, configured to scan the carrier(s) indicated by the base station according to the first configuration parameter and to generate a scan report; and a sending module, configured to send the scan report to the base station according to the second configuration parameter.

Preferably, the first configuration parameter comprises at least one of the following: identification(s) of the carrier(s) indicated by the base station, frequency(s) of the carrier(s) indicated by the base station, and bandwidth(s) of the carrier(s) indicated by the base station.

Preferably, the second configuration parameter comprises at least one of the following: an identification of whether to send the scan report, and a mode of sending the scan report.

Preferably, the scan report comprises information of carrier(s) scanned by the terminal, wherein the information comprises at least one of the following: the number of the scanned carrier(s), identification(s) of the scanned carrier(s), frequency(s) of the scanned carrier(s), and bandwidth(s) of the scanned carrier(s).

With the technical solutions in the present invention, by sending the multi-carrier scan report to the base station after the terminal completes the scan, the problem that the terminal does not have corresponding solution for sending the multi-carrier scan report to the base station in the multi-carrier system is solved, therefore, the terminal can timely send the multi-carrier scan report to the base station after the scan is completed.

The other characteristics and advantages of the present invention will be illustrated in the following specification, and partially become obvious in the specification, or will be understood by implementing the present invention. The object and other advantages of the present invention can be realized and obtained through the structures specifically indicated in the specification, claims and the accompanying drawings.

BRIEF DESCRIPTION OF THE DRAWINGS

The drawings provide a further understanding of the present invention, form a part of the specification and illustrate the present invention together with the embodiments therein without unduly limiting the scope of the present invention, wherein.

DETAILED DESCRIPTION OF THE EMBODIMENTS

Functionality Summary

In the related technologies, when the terminal performs the intra- or inter-base station switch, a plurality of carriers need to be scanned according to the information such as the frequency and the bandwidth of each carrier. However, after the scan is completed, the terminal currently does not have corresponding solution for sending a multi-carrier scan report to the base station. Therefore, the present invention provides an improved solution for sending the scan report based on a multi-carrier system. In the above solution, the terminal acquires a first configuration parameter from carrier(s) indicated by the base station and a second configuration parameter needed for the terminal to send the scan report, wherein the carrier(s) indicated by the base station is one of or a plurality of the carriers of the base station and/or a neighboring base station of the base station; and the terminal scans the carrier(s) indicated by the base station according to the first configuration parameter, generates a scan report, and sends the scan report to the base station according to the second configuration parameter.

The preferable embodiments of the present invention will be described hereinafter in detail in conjunction with the drawings. It should be understood that the preferable embodiments described herein are merely used to describe and illustrate the present invention but not to limit the present invention.

In the following descriptions, for the sake of illustration, a plurality of particular details are described to provide a thorough understanding of the present invention. However, it is apparent that the present invention still can be realized without these particular details. In addition, without departing from the spirit and scope illustrated in the attached claims, the following embodiments and the details therein can be combined.

Method Embodiments

Figure 1:
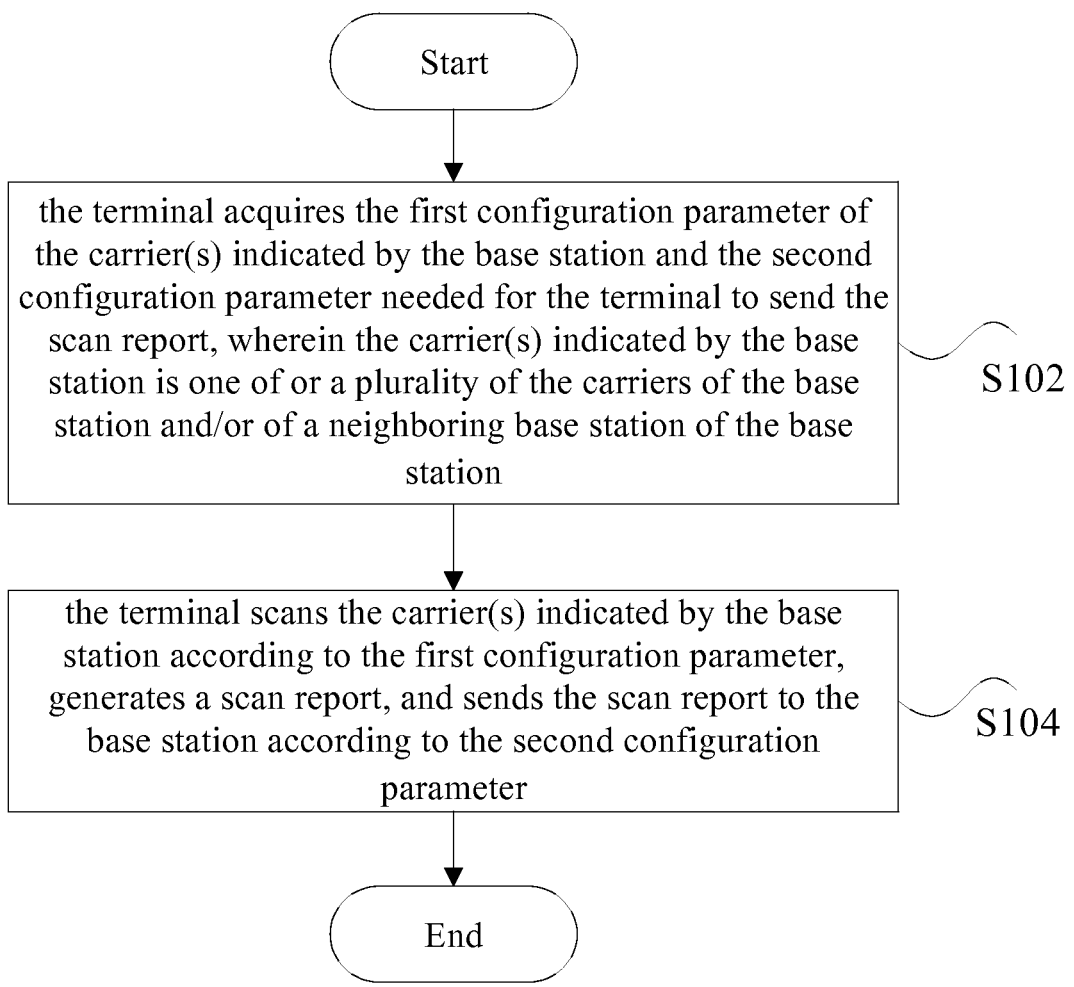
FIG. 1 is a flow chart of the method for sending a scan report based on a multi-carrier system according to an embodiment of the present invention.

According to an embodiment of the present invention, a method for sending a scan report based on a multi-carrier system is provided. FIG. 1 is a flow chart of the method for sending a scan report based on a multi-carrier system according to an embodiment of the present invention.

Before performing the processes as shown in FIG. 1, the base station firstly determines the indicated carrier(s) (or called carrier(s) recommended by the base station) that the terminal needs to scan, and sets the first configuration parameter of the indicated carrier(s); it should be indicated that the carrier(s) indicated by the base station is one of or a plurality of the carriers of the base station and/or a neighboring base station of the base station; and preferably, the carrier(s) indicated by the base station is fully-configured carrier(s).

In addition, the base station further needs to set the second configuration parameter needed for the terminal to send the scan report; after both the first configuration parameter and the second configuration parameter are set, the base station sends the first configuration parameter and the second configuration parameter to the terminal. As shown in FIG. 1, the method for sending a scan report based on the multi-carrier system comprises the processes (step S102-step S104) as follows.

Step S102, the terminal acquires the first configuration parameter of the carrier(s) indicated by the base station and the second configuration parameter needed for the terminal to send the scan report; in addition, the first configuration parameter comprises at least one of the following: the identification(s) of the carrier(s) indicated by the base station, the frequency(s) of the carrier(s) indicated by the base station, and the bandwidth(s) of the carrier(s) indicated by the base station; and the second configuration parameter comprises at least one of the following: the identification of whether to send the scan report, and the mode of sending the scan report. It should be indicated that in practical application, the information comprised in the first configuration parameter and the second configuration parameter is not limited to the above contents.

Step S104, the terminal scans the carrier(s) indicated by the base station according to the first configuration parameter, generates a scan report, and sends the scan report to the base station according to the second configuration parameter; wherein the scan report comprises the information of the carrier(s) scanned by the terminal, the information of the scanned carrier(s) comprising at least one of the following: the number of the scanned carrier(s), the identification(s) of the scanned carrier(s), the frequency(s) of the scanned carrier(s), and the bandwidth(s) of the scanned carrier(s).

Next, the above technical solutions of the present invention will be described with reference to the examples.

Example 1

Figure 2:
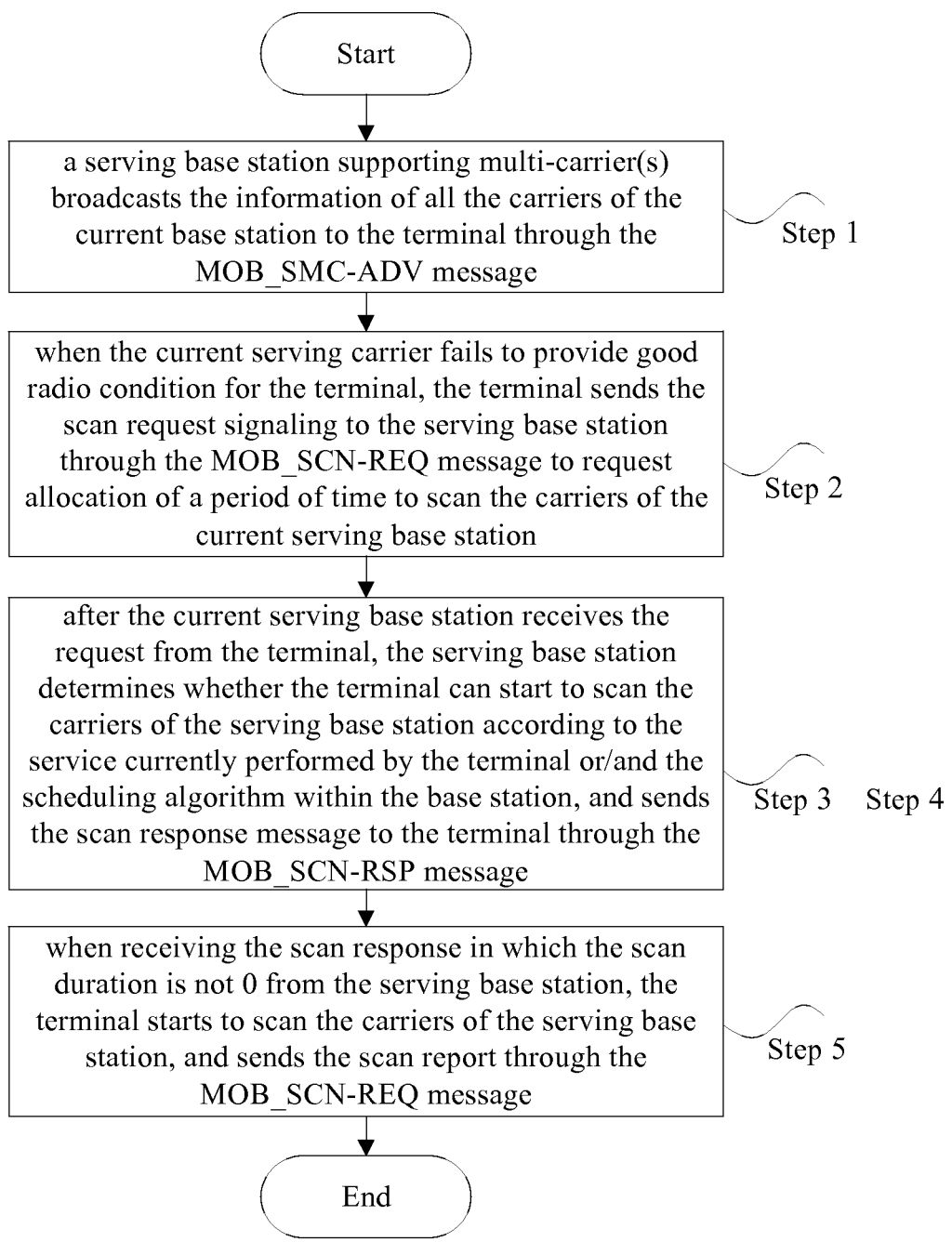
FIG. 2 is a flow chart of Example 1 according to an embodiment of the present invention.

In this example, the carrier information of the current base station (i.e. the multi-carrier information of the base station) is broadcast by the base station to the terminal through an MOB_SMC-ADV message; a scan request signaling is sent from the terminal to the base station through an MOB_SCN-REQ message; a scan response message is sent from the base station to the terminal through an MOB_SCN-RSP message; and the scan report is sent from the terminal to the base station through an MOB_SCN-REP message. FIG. 2 is a flow chart of Example 1 according to an embodiment of the present invention. As shown in FIG. 2, the flow comprises the processes as follows.

Step 1, a serving base station supporting multi-carriers broadcasts information of all carriers of the current base station to the terminal. Specifically, the multi-carrier information of the serving base station can be carried in the MOB_SMC-ADV message which is a new message and a system message about the carrier information within the base station, and can be broadcast by the serving base station to the terminal in its serving area through a broadcast channel. Table 1 shows the message format of the MOB_SMC-ADV message supporting multi-carriers, wherein the multi-carrier information in this message comprises but is not limited to the following parameters: the number of carriers included in the multi-carrier cell, carrier identification (SCID), carrier frequency (SCF) and carrier bandwidth (SCB). The MOB_SMC-ADV message also needs to be added with the following parameters: 1, the number of the multi-carriers in the current serving base station (N_SCARRIERS); 2, a flag indicating whether it is a fully-configured carrier (SFC flag); and 3, the number of the fully-configured carriers in the current serving base station (N_SFCARRIERS).

TABLE 1

| Syntax | Size (bit) | Notes |
|---|---|---|
| MOB_SMC-ADV_Message_format ( ) { | — | — |
| Total Fragmentation | 4 | Total number of the fragmentations |
| N_SCARRIERS | 8 | — |
| For (j = 0 ; j < N_ SCARRIERS; j++){ | — | — |
| Length | 8 | Length of Information including all vectors in the FOR cycle |
| SFC flag | 1 | When SFC flag=1, it means the carrier is a fully-configured carrier, and when SFC flag=0, it means the carrier is a partially-configured carrier. |
| If (SFC flag == 1) { | — | — |
| N_SFCARRIERS | 3 | — |
| For (j = 0 ; j < N_SFCARRIERS; j++) { | — | — |
| SCID | 8 | — |
| SCF | 8 | — |
| SCB | 8 | — |
| } | — | — |
| } | — | — |
| Else{ | — | — |
| SCID | 8 | — |
| SCF | 8 | — |
| SCB | 8 | — |
| } | — | — |
| } | — | — |
| } | — | — |

Step 2, when a serving carrier fails to provide good radio condition for the terminal, the terminal sends the scan request signaling to the serving base station to request allocation of a period of scan time to scan the carriers of the current serving base station. Specifically, when the terminal sends the scan request signaling to the serving base station, the scan request signaling can be carried in the MOB_SCN-REQ message to be sent. Table 2 shows the message format of the MOB_SCN-REQ message supporting multi-carriers. As shown in Table 2, the following parameters can be carried in the MOB_SCN-REQ message: 1, the number index of the recommended serving base station carrier (N_Recommended_SMC_Index), wherein when the value of N_Recommended_SMC_Index is equal to 0xFF, it means the bitmap index of the serving base station carriers (SMC_Bitmap_Index) needs to be used to identify the serving base station carrier index in the MOB_SMC-ADV message, and when the value of N_Recommended_SMC_Index is not equal to 0xFF, it represents that it is the number of carriers recommended in the MOB_SMC-ADV message; 2, the bitmap size of the serving base station (SMC_Bitmap_Size), for representing the size of the bitmap index of the fully-configured carriers of the serving base station; 3, the bitmap index of the serving base station carriers (SMC_Bitmap_Index), for representing the bitmap index of the fully-configured carriers of the serving base station; and 4, the index of the serving base station carriers (SMC_BS_Index), for representing the location index of the serving base station carriers in the MOB_SMC-ADV message.

TABLE 2

| Syntax | Size (bit) | Notes |
|---|---|---|
| ... | ... | ... |
| Scan Iteration | 8 | — |
| N_Recommended_SMC_Index | 8 | When its value is not equal to 0xFF, it is the number of carriers recommended in the MOB_SMC-ADV message, and when its value is equal to 0xFF, (SMC_Bitmap_Index) is used to identify the |

TABLE 2-continued

| Syntax | Size (bit) | Notes |
|---|---|---|
|  |  | serving base station carrier index in the MOB_SMC-ADV message. |
| If(N_Recommended_SMC_Index != 0){ |  |  |
| Configuration Change Count for MOB_NBR-ADV message | 8 |  |
| } |  |  |
| If(N_Recommended_SMC_Index == 0xFF){ | — | — |
| Reserved | 1 | Can be set to be 0 |
| Req_Seq_Num | 1 | One-bit sequence number of the message associated with each new message |
| SMC_Bitmap_Size | 6 | Its size is smaller than or equal to the number of carriers of the serving base station in the MOB_ SMC ADV message |
| SMC_Bitmap_Index | (SMC_Bitmap_Size+1)×4 | 0; corresponding multi-carrier is not requested. 1: corresponding multi-carrier is requested. |
| for( each '1' in Nbr_Bitmap_Index){ | — | — |
| Reserved | 1 | Can be set to be 0 |
| Scanning_type | 1 | 0b000: non-association scan; 0b001: stratum 0 association scan; 0b010: stratum 1 association scan; 0b011: stratum 2 association scan; 0b100—0b111: reserved |
| } | — | — |
| } else { | — | — |
| for(j = 0; j < N_Recommended_SMC_Index; j++){ | — | — |
| SMC_BS_Index | 8 | Corresponding location index of the serving base station carriers in the MOB_SMC-ADV message |
| Req_Seq_Num | 1 | One-bit sequence number of the message associated with each new message |
| Scanning_type | 1 | 0b000: non-association scan; 0b001: stratum 0 association scan; 0b010: stratum 1 association scan; 0b011: stratum 2 association scan; 0b100—0b111: reserved |
| } |  |  |
| } | — | — |
| N_Recommended_BS_Index | 8 | When its value is not equal to 0xFF, it is the number of the base station recommended in the MOB_NBR-ADV message, and when its value is equal to 0xFF, (BS_Bitmap_Index) is used to identify the base station index in the MOB_NBR-ADV message. |
| ... | ... | ... |
| } | — | — |

Step 3: after the serving base station receives the MOB_SCN-REQ message carrying the scan request signaling from the terminal, the serving base station determines whether the terminal can start to scan the carriers of the serving base station according to the service currently performed by the terminal and/or a scheduling algorithm within the base station. Specifically, if the serving base station authorizes a scan interval (i.e. scan duration) as long as the requested period to the terminal, the terminal then can start to scan the carriers of the serving base station, and if the scan duration authorized by the serving base station to the terminal is 0, it means the serving base station refuses the carrier scan request of the terminal.

Figure 3:
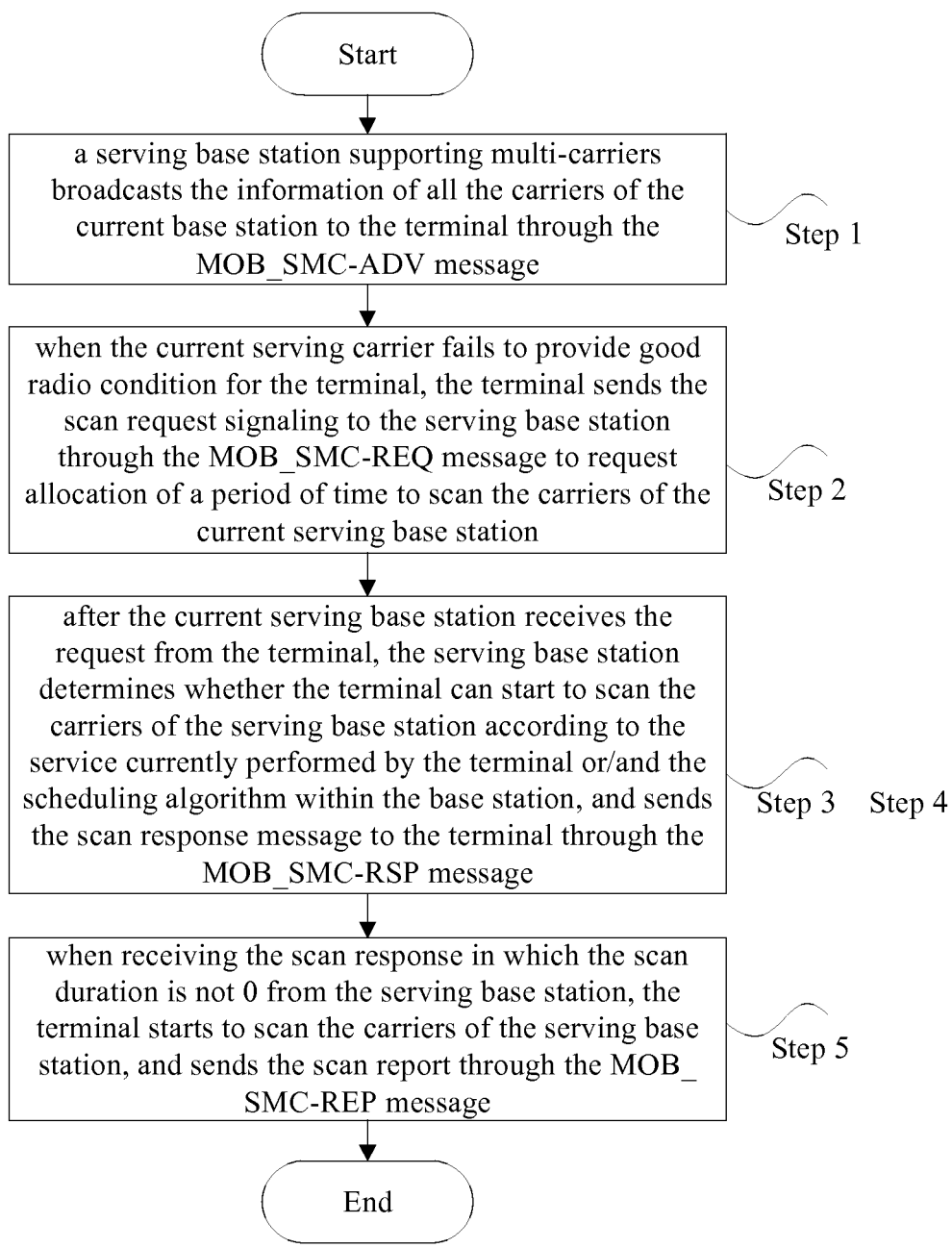
FIG. 3 is a flow chart of Example 2 according to an embodiment of the present invention.

Step 4, when determining that the terminal can start to scan the carriers of the serving base station, the serving base station sends the scan response message to the terminal (corresponding to step S102 in FIG. 1). Specifically, the scan response message sent from the serving base station to the terminal can be included in the MOB_SCN-RSP message. This message can be sent through a basic connection identifier (BASIC CID). Table 3 shows the message format of the MOB_SCN-RSP message supporting multi-carriers. As shown in FIG. 3, the message can be added with the following parameters: 1, whether the carrier index bitmap in the MOB_SMC-ADV message is used (Use_SMC_Bitmap_Index); 2, whether the carrier index bitmap in the MOB_SCN-REQ message is used (Use_ReqSMC_Bitmap_Index); 3, the configuration change count in the MOB_SMC-ADV message (Configuration change count for MOB_SMC-ADV); 4, the size of the bitmap index in the MOB_SMC-ADV message (SMC_Bitmap_Size); 5, whether corresponding carrier is recommended (SMC_Bitmap_Index); 6, the number of the recommended carriers (N_Recommended_SMC_Index); 7, the carrier index in the MOB_SMC-ADV message (SMC_Index); 8, the number of the recommended serving carriers using 48-bit identification (ID) (N_Recommended_SMC_Full); and 9, the recommended carrier ID (Recommended SMC ID).

TABLE 3

| Syntax | Size(bit) | Notes |
|---|---|---|
| MOB_SCN-RSPMessage_format( ) { | — | — |
| ... | ... | ... |
| Rsp_Seq_Num | 1 | — |
| Use_SMC_Bitmap_Index | 8 | 0: the carrier index bitmap in the MOB_SMC-ADV message is not used. 1: the carrier index bitmap in the MOB_SMC-ADV message is used. |
| Use_ReqSMC_Bitmap_Index | 8 | 0: the carrier index bitmap in the MOB_SCN-REQ message is not used. 1: the carrier index bitmap in the MOB_SCN-REQ message is used. |
| Use_Nbr_Bitmap_Index | 1 | — |
| ... | ... | ... |
| if (Scan Duration != 0) { | — | — |
| ... | ... | ... |
| Scan iteration | 8 | — |
| If( Use_SMC_Bitmap_Index == 1){ | — | — |
| Configuration change count for MOB_SMC-ADV | 8 | — |
| SMC_Bitmap_Size | 6 |  |

TABLE 3-continued

| Syntax | Size(bit) | Notes |
| --- | --- | --- |
| SMC_Bitmap_Index | 8 | 0: corresponding carrier is not used. 1: corresponding carrier is used. |
| for( each '1' in SMC_Bitmap_Index ){ | — | — |
| ... | ... | ... |
| } else { | — | — |
| N_Recommended_SMC_Index | 8 | Scan the carrier list in the MOB_SMC-ADV message when it is 0 |
| If(N_Recommended_SMC_Index !=0){ | — | — |
| Configuration change count for MOB_SMC-ADV | 8 | — |
| } | | |
| for(j = 0; j < N_Recommended_SMC_Index; j++){ | — | — |
| SMC_Index | 8 | |
| ... | ... | ... |
| } | — | — |
| If( Use_ReqSMC_Bitmap_Index == 1 ) | — | — |
| ... | ... | ... |
| } | — | — |
| N_Recommended_SMC_Full | 8 | |
| For(j = 0; j < N_Recommended_SMC_Full; j++){ | — | — |
| Recommended SMC ID | 48 | |
| ... | ... | ... |
| } | — | — |
| } | — | — |
| if (Scan Duration != 0) { | — | — |
| ... | ... | ... |
| } | — | — |
| } | — | — |
| Padding | — | — |
| ... | ... | ... |
| } | — | — |

Step 5, when receiving the scan response in which the scan duration is not 0 from the serving base station, the terminal starts to scan the carriers of the serving base station and determines whether to send the multi-carrier scan report and how to send the scan report according to the parameters in the scan response (corresponding to the step S104 in FIG. 1). Specifically, when Report mode=0b00 in the scan response message, it means the terminal does not need to send the scan report; when Report mode=0b01, it means the scan report needs to be sent periodically; when Report mode=0b10, it means an event initiation report needs to be sent (as long as the initiation condition is met); and when Report mode=0b11, it means the scan report only needs to be sent once.

Figure 4:
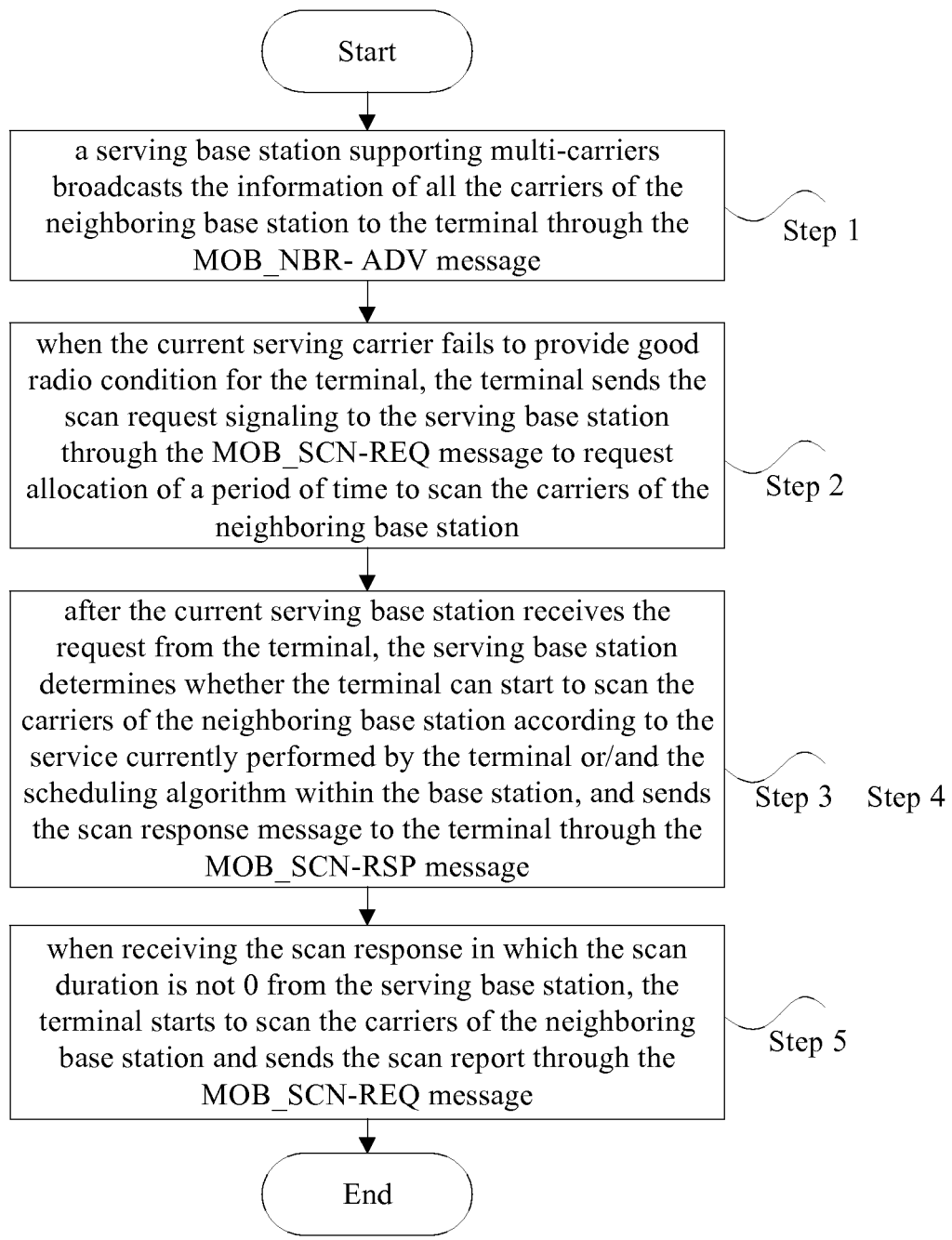
FIG. 4 is a flow chart of Example 3 according to an embodiment of the present invention.

In addition, the multi-carrier scan report for the serving base station from the terminal can be included in the MOB_SCN-REP message which is sent through the key management connection identifier (CID). Table 4 shows the message format of the MOB_SCN-REP message supporting multi-carriers. As shown in FIG. 4, this message includes all information of the serving base station multi-carriers inquired in the MOB_SCN-REQ message. Specifically, this message can be added with the following parameters: 1, the number of the existing multi-carriers in the current serving base station (N_current_SMCs); 2, whether the carrier index bitmap in the MOB_SMC-ADV message is used (Use_SMC_Bitmap_Index); 3, whether the carrier index bitmap in the MOB_SCN-RSP message is used (Use_RspSMC_Bitmap_Index); 4, SMC_Bitmap_Index; 5, RspSMC_Bitmap_Index; 6, the size of RspSMC_Bitmap_Index (RspSMC_Bitmap_Size); 7, the temporary multi-carrier ID of the serving base station (Temp SMCID); 8, the configuration change count in the MOB_SMC-ADV message (Configuration change count for MOB_SMC-ADV); 9, the size of Use_SMC_Bitmap_Index (SMC_Bitmap_Size); 10, whether the corresponding carrier is recommended (SMC_Bitmap_Index); 11, the number of the carriers (N_SMC_Index); 12, the carrier index in the MOB_SMC-ADV message (SMC_Index); 13, the number of the recommended serving carriers using 48-bit ID (N_SMC_Full); 14, the recommended carrier ID (SMC ID); and 15, the carrier index bitmap in the MOB_SCN-RSP message (RspSMC_Bitmap_Index).

TABLE 4

| Syntax | Size (bit) | Notes |
| --- | --- | --- |
| MOB_SCN-REP_Message_format( ) { | — | — |
| ... | ... | ... |
| Report Mode | 1 | — |
| N_current_SMCs | | |
| Use_SMC_Bitmap_Index | 8 | 0: the carrier index bitmap in the MOB_SMC-ADV message is not used. 1: the carrier index bitmap in the MOB_SMC-ADV message is used. |
| Use_RspSMC_Bitmap_Index | 8 | 0: the carrier index bitmap in the MOB_SCN-REQ message is not used. 1: the carrier index bitmap in the MOB_SCN-REQ message is used. |
| ... | ... | ... |
| Report metric | 8 | On which type of metric the triggering is based: Bit 0: SMC CINR mean; Bit 1: SMC RSSI mean; Bit 2: Relative delay Bit 3: SMC RTD; merely measured between the serving carrier and the terminal; Bits 4-7: reserved and set to be 0 |
| For (j = 0; j < N_current_SMCs; j++) { | — | — |
| Temp SMCID | 4 | — |
| If (Report metric[Bit 0] == 1) | — | — |
| SMC CINR mean | 8 | — |
| If (Report metric[Bit 1] == 1) | — | — |
| SMC RSSI mean | 8 | — |
| If ((Report metric[Bit 2] == 1) and (Temp SMCID == anchor SMC) ) | — | — |
| Relative delay | 8 | — |
| If ((Report metric[Bit 3] == 1) and ((Temp SMCID == anchor SMC) or (Temp SMCID == serving SMC))) | — | — |
| SMC RTD | 8 | — |
| } | — | — |
| If( Use_SMC_Bitmap_Index == 1){ | — | — |
| Configuration change count for MOB_SMC-ADV | 8 | — |
| SMC_Bitmap_Size | 6 | |
| SMC_Bitmap_Index | 8 | 0: corresponding carrier is not used. 1: corresponding carrier is used. |

TABLE 4-continued

| Syntax | Size (bit) | Notes |
|---|---|---|
| for( each '1' in SMC_Bitmap_Index ){ | — | |
| If (Report metric[Bit 0] == 1) | — | — |
| SMC CINR mean | 8 | — |
| If (Report metric[Bit 1] == 1) | — | — |
| SMC RSSI mean | 8 | — |
| If ((Report metric[Bit 2] == 1) | — | — |
| Relative delay | 8 | — |
| } | — | — |
| } else { | — | — |
| N_SMC_Index | 8 | The number of carriers in the MOB_SMC-ADV message |
| If(N_SMC_Index != 0){ | — | — |
| Configuration change count for MOB_SMC-ADV | 8 | — |
| } | | |
| for(j = 0; j < N_ SMC_Index; j++){ | — | |
| SMC_Index | 8 | |
| If (Report metric[Bit 0] == 1) | — | — |
| SMC CINR mean | 8 | — |
| If (Report metric[Bit 1] == 1) | — | — |
| SMC RSSI mean | 8 | — |
| If (Report metric[Bit 2] == 1) | — | — |
| Relative delay | 8 | — |
| } | — | — |
| } | — | — |
| N_SMC_Full | 8 | |
| For(j = 0; j < N_SMC_Full; j++){ | — | — |
| SMC ID | 48 | |
| If (Report metric[Bit 0] == 1) | — | — |
| SMC CINR mean | 8 | — |
| If (Report metric[Bit 1] == 1) | — | — |
| SMC RSSI mean | 8 | — |
| If ((Report metric[Bit 2] == 1) | — | — |
| Relative delay | 8 | — |
| } | — | — |
| RspSMC_Bitmap_Size | 6 | — |
| RspSMC_Bitmap_index | (RspSMC_Bitmap_Size +1)×4 | — |
| for( each '1' in RspSMC_Bitmap_index){ | — | |
| If (Report metric[Bit 0] == 1) | — | — |
| SMC CINR mean | 8 | — |
| If (Report metric[Bit 1] == 1) | — | — |
| SMC RSSI mean | 8 | — |
| If ((Report metric[Bit 2] == 1) | — | — |
| Relative delay | 8 | — |
| } | — | — |
| } | — | — |
| N_current_BSs | 3 | — |
| ... | ... | ... |
| } | — | — |
| } | — | — |
| Padding | variable | — |
| TLV encoded information | variable | ... |
| } | — | — |

It can be concluded from the above processes that the terminal is able to send the multi-carrier scan report of the current base station to the base station through the MOB_SCN-REP message.

Example 2

In this example, the carrier information of the current base station (i.e. the multi-carrier information of the base station) is broadcast by the serving base station to the terminal through an MOB_SMC-ADV message; a scan request signaling is sent from the terminal to the base station through an MOB_SMC-REQ message; a scan response message is sent from the base station to the terminal through an MOB_SMC-RSP message; and the scan report is sent from the terminal to the base station through an MOB_SMC-REP message. FIG. 3 is a flow chart of Example 2 according to an embodiment of the present invention. As shown in FIG. 3, the flow comprises the processes as follows.

Step 1, a serving base station supporting multi-carriers broadcasts all carrier information of the current base station to the terminal. Specifically, the multi-carrier information of the serving base station can be carried in the MOB_SMC-ADV message which is a new message and a system message about the carrier information within the base station, and can be broadcast by the serving base station to the terminal in a serving area of the serving base station through the broadcast channel. The format of the MOB_SMC-ADV message supporting multi-carriers can be seen in Table 1. The multi-carrier information in this message comprises but is not limited to the following parameters: the number of carriers included in the multi-carrier cell, carrier identification (SCID), carrier frequency (SCF) and carrier bandwidth (SCB). The MOB_SMC-ADV message also can be added with the following parameters: 1, the number of multi-carriers in the current serving base station N_SCARRIERS; 2, a flag indicating whether it is a fully-configured carrier SFC flag; and 3, the number of fully-configured carriers in the current serving base station N_SFCARRIERS.

Step 2, when the current serving carrier fails to provide good radio condition for the terminal, the terminal sends the scan request signaling to the serving base station to request allocation of a period of time to scan the carriers of the current serving base station. Specifically, when the terminal sends the scan request signaling to the serving base station, the scan request can be sent through the MOB_SMC-REQ message so as to request allocation of a scan interval, scan estimation time or recommended start frame. The MOB_SMC-REQ message is a new message. Table 5 shows the message format of the MOB_SMC-REQ message supporting multi-carriers. As shown in Table 5, the following parameters can be carried in the MOB_SMC-REQ message: 1, Scan duration; 2, Interleaving interval; 3, Scan Iteration; 4, the number index of the recommended serving base station carriers (N_Recommended_SMC_Index), wherein when the value of N_Recommended_SMC_Index is equal to 0xFF, it means the bitmap index of the serving base station carriers (SMC_Bitmap_Index) needs to be used to identify the serving base station carrier index in the MOB_SMC-ADV message, and when the value of N_Recommended_SMC_Index is not equal to 0xFF, it represents the number of recommended carriers in the MOB_SMC-ADV message is recommended; 5, the bitmap size of the serving base station carriers (SMC_Bitmap_Size), for representing the size of the bitmap index of the fully-configured carriers of the serving base station; 6, the bitmap index of the serving base station carriers (SMC_Bitmap_Index), for representing the bitmap index of the fully-configured carriers of the serving base station; and 7, the index of the serving base station carriers (SMC_BS_Index), for representing the location index of the serving base station carriers in the MOB_SMC-ADV message (corresponding to the step S104 in FIG. 1).

TABLE 5

| Syntax | Size (bit) | Notes |
|---|---|---|
| MOB_SMC-ADV_Message_format( ) { | — | — |
| Scan duration | 8 | — |
| Interleaving interval | 8 | — |
| Scan Iteration | 8 | — |
| N_Recommended_SMC_Index | 8 | When its value is not equal to 0xFF, it is the number of recommended carriers in the MOB_SMC-ADV message, and when its value is equal to 0xFF, (SMC_Bitmap_Index) is used to identify the serving base station carrier index in the MOB_SMC-ADV message. |
| If(N_Recommended_SMC_Index != 0){ | | |
| Configuration Change Count for MOB_ SMC -ADV message } | 8 | |
| If(N_Recommended_SMC_Index == 0xFF){ | — | — |
| Reserved | 1 | Can be set to be 0 |
| Req_Seq_Num | 1 | One-bit sequence number of the message associated with each new message |
| SMC_Bitmap_Size | 6 | This size is smaller than or equal to the number of the carriers of the serving base station in the MOB_SMC-ADV message |
| SMC_Bitmap_Index | (SMC_Bitmap_Size + 1) × 4 | 0: corresponding multi-carrier is not requested. 1: corresponding multi-carrier is requested. |
| for( each '1' in Nbr_Bitmap_Index){ | — | — |
| Reserved | 1 | Can be set to be 0 |
| Scanning_type | 1 | 0b000: non-association scan; 0b001: stratum 0 association scan; 0b010: stratum 1 association scan; 0b011: stratum 2 association scan; 0b100-0b111: reserved |
| } } else { | — | — |
| for(j = 0; j < N_Recommended_SMC_Index; j++){ | — | — |
| SMC_BS_Index | 8 | Corresponding location index of the serving base station carriers in the MOB_SMC-ADV message |
| Req_Seq_Num | 1 | One-bit sequence number of the message associated with each new message |
| Scanning_type | 1 | 0b000: non-association scan; 0b001: stratum 0 association scan; 0b010: stratum 1 association scan; 0b011: stratum 2 association scan; 0b100-0b111: reserved |
| } } } | — | — |

Step 3: after the current serving base station receives the MOB_SMC-REQ message carrying the scan request signaling from the terminal, the serving base station determines whether the terminal can start to scan the carriers of the serving base station according to the service currently performed by the terminal and/or the scheduling algorithm within the base station. Specifically, if the serving base station authorizes a scan interval (i.e. scan duration) as long as the requested period to the terminal, the terminal then can start to scan the carriers of the serving base station, and if the scan duration authorized by the serving base station to the terminal is 0, it means the serving base station refuses the carrier scan request of the terminal.

Figure 6:
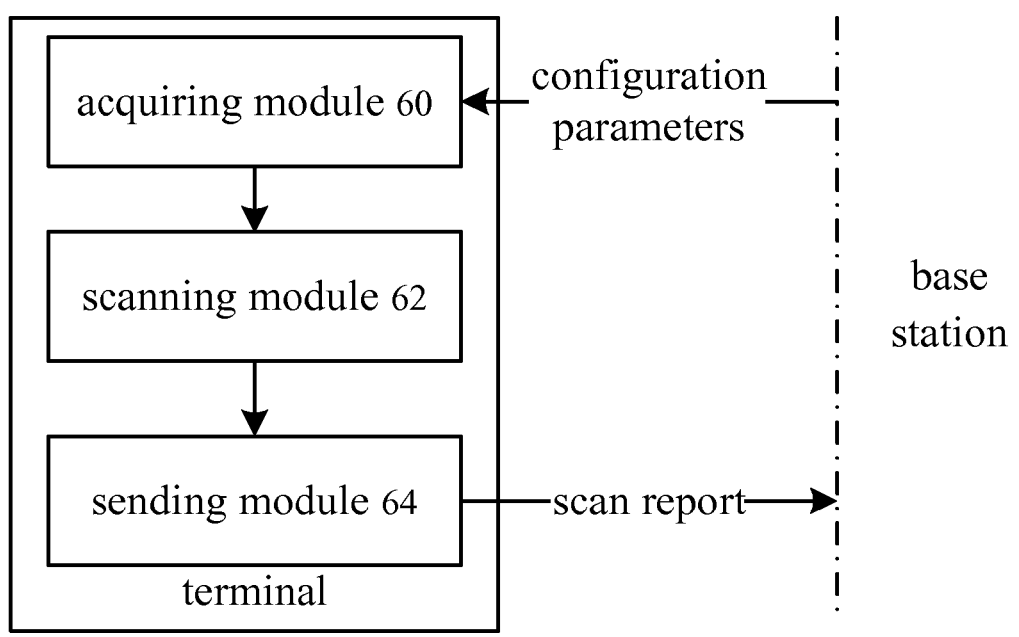
FIG. 6 is a block diagram of the terminal according to an embodiment of the present invention.

Step 4, when determining that the terminal can start to scan the carriers of the serving base station, the serving base station sends the scan response message to the terminal (corresponding to step S102 in FIG. 1). Specifically, the response of the serving base station to the multi-carrier scan request of the terminal can be included in the new message MOB_SMC-RSP. This message is sent through the BASIC CID. Table 6 shows the message format of the MOB_smc-RSP message supporting multi-carriers. As shown in FIG. 6, the message can be added with the following parameters: 1, Scan duration; 2, Report mode; 3, Report period; 4, Report metric; 5, scanning type (Scanning_type); 6, whether the carrier index bitmap in the MOB_SMC-ADV message (a first message sending the multi-carrier information) is used (Use_SMC_Bitmap_Index); 7, whether the carrier index bitmap in the MOB_SCN-REQ message (a second message sending the scan request signaling) is used (Use_ReqSMC_Bitmap_Index); 8, the configuration change count in the MOB_SMC-ADV message (Configuration change count for MOB_SMC-ADV); 9, the size of the bitmap index in the MOB_SMC-ADV message (SMC_Bitmap_Size); 10, whether corresponding carrier is recommended (SMC_Bitmap_Index); 11, the number of the recommended carriers (N_Recommended_SMC_Index); 12, the carrier index in the MOB_SMC-ADV message (SMC_Index); 13, the number of the recommended serving carriers using 48-bit identification (ID) (N_Recommended_SMC_Full); and 14, the recommended carrier ID (Recommended SMC ID).

Step 5, when receiving the scan response in which the scan duration is not 0 from the serving base station, the terminal starts to scan the carriers of the serving base station and determines whether to send the multi-carrier scan report and how to send the above scan report according to the parameters in the scan response (corresponding to the step S104 in FIG. 1). Specifically, when Report mode=0b00 in the scan response message, it means the terminal does not need to send the scan report; when Report mode=0b01, it means the scan

TABLE 6

| Syntax | Size (bit) | Notes |
|---|---|---|
| MOB_SMC-RSP_Message_format( ) { | — | — |
|     Scan duration | 8 | — |
|     Report mode | 2 | 0b00; no report; 0b01: periodical report; 0b10: event initiation report; 0b11: scan once |
|     Rsp_Seq_Num | 1 | — |
| Use_SMC_Bitmap_Index | 8 | 0: the carrier index bitmap in the MOB_SMC-ADV message is not used. 1: the carrier index bitmap in the MOB_SMC-ADV message is used. |
| Use_ReqSMC_Bitmap_Index | 8 | 0: the carrier index bitmap in the MOB_SCN-REQ message is not used. 1: the carrier index bitmap in the MOB_SCN-REQ message is used. |
|     Report period | 1 | When "Report mode" is 0b01 and 0b11, it is meaningful; otherwise, it is 0. |
|     Report metric | 8 | On which type of metric the triggering is based: Bit 0: SMC CINR mean; Bit 1: SMC RSSI mean; Bit 2: Relative Delay; Bit 3: SMC RTD, merely measured between the serving carrier and the report terminal; Bits 4-7: reserved and set to be 0 |
| if (Scan Duration !=0) { | — | — |
|     Start frame | 8 | — |
|     Interleaving interval | 8 | — |
|     Scan iteration | 8 | — |
| If( Use_SMC_Bitmap_Index == 1){ | — | — |
| Configuration change count for MOB_SMC-ADV | 8 | — |
|     SMC_Bitmap_Size | 6 | — |
|     SMC_Bitmap_Index | 8 | 0: corresponding carrier is not used. 1: corresponding carrier is used. |
| for( each '1' in SMC_Bitmap_Index ){ | — | — |
|     Scanning_type | 3 | 0b001: scan with a band association level 0: 0b010: scan with a band association level 1: 0b011: scan with a band association level 2: 0b100-0b111: reserved |
| ... | ... | ... |
| } else { | — | — |
| N_Recommended_SMC_Index | 8 | Scan the carrier list in the MOB_SMC-ADV message when it is 0 |
| If(N_Recommended_SMC_Index !=0){ | — | — |
|     Configuration change count for MOB_SMC-ADV } | 8 | — |
| for(j = 0; j < N_Recommended_SMC_Index; j++){ | — | — |
|     SMC_Index | 8 | — |
| ... | ... | ... |
| } | — | — |
| If( Use_ReqSMC_Bitmap_Index == 1 ) | — | — |
| ... | ... | ... |
| } | — | — |
| N_Recommended_SMC_Full | 8 | — |
| For(j = 0; j < N_Recommended_SMC_Full; j++){ | — | — |
| Recommended SMC ID | 48 | — |
| ... | ... | ... |
| TLV encoded information } | — | — | report needs to be sent periodically; when Report mode=0b10, it means the event initiation report needs to be sent (as long as the initiation condition is met); and when Report mode=0b11, it means the scan report only needs to be sent once.

In addition, the multi-carrier scan report for the serving base station from the terminal can be included in the new message MOB_SMC-REP message which is sent through the key management CID. Table 7 shows the message format of the MOB_SMC-REP message supporting multi-carriers. This message includes all information of the serving base station multi-carriers inquired in the MOB_SCN-REQ message. Specifically, the following parameters can be set in this message: 1, the carrier-to-noise ratio mean of the serving base station carriers (SMC CINR mean); 2, the received signal strength indicator mean of the serving base station (SMC RSSI mean); 3, Relative delay; 4, return delay between the scan terminal and the serving carrier (SMC RTD); 5, the number of the existing multi-carriers in the current serving base station (N_current_SMCs); 6, whether the carrier index bitmap in the MOB_SMC-ADV message is used (Use_SMC_Bitmap_Index); 7, whether the carrier index bitmap in the MOB_SCN-RSP message is used (Use_RspSMC_Bitmap_Index); 8, SMC_Bitmap_Index; 9, RspSMC_Bitmap_Index; 10, the size of RspSMC_Bitmap_Index (RspSMC_Bitmap_Size); 11, the serving base station temporary multi-carrier ID (Temp SMCID); 12, the configuration change count in the MOB_SMC-ADV message (Configuration change count for MOB_SMC-ADV); 13, the size of Use_SMC_Bitmap_Index (SMC_Bitmap_Size); 14, whether the corresponding carrier is recommended (SMC_Bitmap_Index); 15, the number of carriers (N_SMC_Index); 16, the carrier index in the MOB_SMC-ADV message (SMC_Index); 17, the number of the recommended serving carriers using 48-bit ID (N_SMC_Full); 18, the recommended carrier ID (SMC ID); and 19, the carrier index bitmap in the MOB_SCN-RSP message (RspSMC_Bitmap_Index).

TABLE 7

| Syntax | Size (bit) | Notes |
|---|---|---|
| MOB_SMC-REP_Message_format( ) { | — | — |
| Report Mode | 1 | — |
| N_current_SMCs | | |
| Use_SMC_Bitmap_Index | 8 | 0: the carrier index bitmap in the MOB_SMC-ADV message is not used<br>1: the carrier index bitmap in the MOB_SMC-ADV message is used. |
| Use_RspSMC_Bitmap_Index | 8 | 0: the carrier index bitmap in the MOB_SCN-REQ message is not used<br>1: the carrier index bitmap in the MOB_SCN-REQ message is used. |
| . . . | . . . | . . . |
| Report metric | 8 | On which type of metric the triggering is based:<br>Bit 0: SMC CINR mean; Bit 1: SMC RSSI mean; Bit 2: Relative delay Bit 3: SMC RTD; merely measured between the serving carrier and the terminal; Bits 4-7: reserved and set to be 0 |
| For (j = 0; j < N_current_SMCs; j++) { | — | — |
| Temp SMCID | 4 | — |
| If (Report metric[Bit 0] == 1) | — | — |
| SMC CINR mean | 8 | — |
| If (Report metric[Bit 1] == 1) | — | — |
| SMC RSSI mean | 8 | — |
| If ((Report metric[Bit 2] == 1) and (Temp SMCID == anchor SMC) ) | — | — |
| Relative delay | 8 | — |
| If ((Report metric[Bit 3] == 1) and ((Temp SMCID == anchor SMC) or (Temp SMCID == serving SMC))) | — | — |
| SMC RTD | 8 | — |
| } | — | — |
| If( Use_SMC_Bitmap_Index == 1){ | — | — |
| Configuration change count for MOB_SMC-ADV | 8 | — |
| SMC_Bitmap_Size | 6 | |
| SMC_Bitmap_Index | 8 | 0: corresponding carrier is not used.<br>1: corresponding carrier is used. |
| for( each '1' in SMC_Bitmap_index ){ | — | — |
| If (Report metric[Bit 0] == 1) | — | — |
| SMC CINR mean | 8 | — |
| If (Report metric[Bit 1] == 1) | — | — |
| SMC RSSI mean | 8 | — |
| If ((Report metric[Bit 2] == 1) | — | — |
| Relative delay | 8 | — |
| } | — | — |
| } else { | — | — |
| N_SMC_Index | 8 | The number of carriers in the MOB_SMC-ADV message |

TABLE 7-continued

| Syntax | Size (bit) | Notes |
|---|---|---|
| If(N_SMC_index != 0){ | | — |
| Configuration change count for MOB_SMC-ADV | 8 | — |
| } | | |
| for(j = 0; j < N_SMC_Index; j++){ | | — |
| SMC_Index | 8 | |
| If (Report metric[Bit 0] == 1) | — | — |
| SMC CINR_mean | 8 | — |
| If (Report metric[Bit 1] == 1) | — | — |
| SMC RSSI_mean | 8 | — |
| If ((Report metric[Bit 2] == 1) | — | — |
| Relative delay | 8 | — |
| } | — | — |
| } | — | — |
| N_SMC_Full | 8 | |
| For(j = 0; j < N_SMC_Full; j++){ | — | — |
| SMC ID | 48 | |
| If (Report metric[Bit 0] == 1) | — | — |
| SMC CINR_mean | 8 | — |
| If (Report metric[Bit 1] == 1) | — | — |
| SMC RSSI_mean | 8 | — |
| If ((Report metric[Bit 2] == 1) | — | — |
| Relative delay | 8 | — |
| } | — | — |
| RspSMC_Bitmap_Size | 6 | — |
| RspSMC_Bitmap_index | (RspSMC_Bitmap_Size + 1) × 4 | — |
| for( each '1' in RspSMC_Bitmap_index){ | | — |
| If (Report metric[Bit 0] == 1) | — | — |
| SMC CINR_mean | 8 | — |
| If (Report metric[Bit 1] == 1) | — | — |
| SMC RSSI_mean | 8 | — |
| If ((Report metric[Bit 2] == 1) | — | — |
| Relative delay | 8 | — |
| } | — | — |
| } | — | — |
| Padding | variable | — |
| TLV encoded information | variable | ... |
| } | — | — |

It can be concluded from the above processes that the terminal is able to send the multi-carrier scan report of the current base station to the base station through the MOB_SMC-REP message.

Example 3

In the present example, the carrier information of a neighboring base station (i.e. the multi-carrier information of the base station) is broadcast by the base station to the terminal through the MOB_NBR-ADV message; a scan request signaling is sent from the terminal to the base station through the MOB_SCN-REQ message; a scan response message is sent from the base station to the terminal through the MOB_SCN-RSP message; and a scan report is sent from the terminal to the base station through the MOB_SCN-REP message. FIG. 4 is a flow chart of Example 3 according to an embodiment of the present invention. As shown in FIG. 4, the flow comprises the processes as follows.

Step 1, a serving base station supporting multi-carriers broadcasts the information of all carriers (the above-mentioned multi-carrier information) of its neighboring base station to the terminal. Specifically, the multi-carrier information of the neighboring base station can be carried in the MOB_NBR-ADV message. Table 8 shows the message format of the MOB_NBR-ADV message supporting multi-carriers. As shown in Table 8, the multi-carrier information in this message comprises but is not limited to the following parameters: the identification of the neighboring base station, preamble index/sub-channel index, an indication of whether it is a co-location, time and frequency synchronization indication (SCID), an indication of whether it is the fully-configured carrier, the number of the carriers included in the multi-carrier cell, carrier identification (SCID), carrier frequency (SCF) and carrier bandwidth (SCB).

TABLE 8

| Syntax | Size (bit) | Notes |
|---|---|---|
| ... | ... | ... |
| N_NEIGHBORS | 8 | — |
| For (j = 0; j < N_NEIGHBORS; j++){ | — | — |
| Length | 8 | Information length of all the vectors included in the FOR cycle |
| N_CARRIERS | 3 | — |
| For (j = 0; j < N_CARRIERS; j++){ | — | — |
| FC flag | 1 | When FC flag = 1, it means the carrier is a fully-configured carrier, and when FC flag = 0, it means the carrier is a partially-configured carrier. |
| FID | — | — |
| FF | — | — |
| FB | — | — |
| } | — | — |
| ... | ... | ... |
| } | — | — |
| ... | ... | ... |

Step 2, when the serving carrier fails to provide good radio condition for the terminal, the terminal sends the scan request signaling to the serving base station to request allocation of a period of scan time to scan the carriers of the neighboring base station. Specifically, when the terminal sends the scan request signaling of scanning the carriers of the neighboring base station to the serving base station, the scan request signaling can be carried in the MOB_SCN-REQ message to be sent. Table 9 shows the message format of the MOB_SCN-REQ message supporting multi-carriers. As shown in Table 9, the following parameters can be carried in the MOB_SCN-REQ message: 1, the number index of the recommended neighboring base station carriers (N_Recommended_SMC_Index), wherein when the value of N_Recommended_SMC_Index is equal to 0xFF, it means the bitmap index of the neighboring base station carriers (SMC_Bitmap_Index) needs to be used to identify the neighboring base station carrier index in the MOB_NBR-ADV message, and when the value of N_Recommended_SMC_Index is not equal to 0xFF, it represents that it is the number of recommended carriers in the MOB_NBR-ADV message; 2, the bitmap size of the neighboring base station carriers (SMC_Bitmap_Size), for representing the size of the bitmap index of the fully-configured carriers of the neighboring base station; 3, the bitmap index of the neighboring base station carriers (SMC_Bitmap_Index), for representing the bitmap index of the fully-configured carriers of the neighboring base station; and 4, the neighboring base station carrier index (SMC_BS_Index), for representing the location index of the neighboring base station carriers in the MOB_NBR-ADV message.

TABLE 9

| Syntax | Size (bit) | Notes |
|---|---|---|
| ... | ... | ... |
| Scan Iteration | 8 | — |
| N_Recommended_SMC_Index | 8 | When its value is not equal to 0xFF, it is the number of recommended carriers in the MOB_NBR-ADV message, and when its value is equal to 0xFF, (SMC_Bitmap_Index) is used to identify the serving base station carrier index in the MOB_NBR-ADV message. |
| If(N_Recommended_SMC_Index != 0){ | | |
| Configuration Change Count for MOB_NBR-ADV message | 8 | |
| } | — | — |
| If(N_Recommended_SMC_Index == 0xFF){ | — | — |
| Reserved | 1 | Can be set to be 0 |
| Req_Seq_Num | 1 | One-bit sequence number of the message associated with each new message |
| SMC_Bitmap_Size | 6 | This size is smaller than or equal to the number of the serving base station carriers in the MOB_NBR-ADV message |
| SMC_Bitmap_Index | (SMC_Bitmap_Size + 1) × 4 | 0: corresponding multi-carrier is not requested. 1: corresponding multi-carrier is requested. |
| for( each '1' in Nbr_Bitmap_Index){ | — | — |
| Reserved | 1 | Can be set to be 0 |
| Scanning_type | 1 | 0b000: non-association scan; 0b001: stratum 0 association scan; 0b010: stratum 1 association scan; 0b011: stratum 2 association scan; 0b100-0b111: reserved |
| } } else { | — | — |
| for(j = 0; j < N_Recommended_SMC_Index; j++) { | — | — |
| SMC_BS_Index | 8 | Corresponding location index of the serving base station carriers in the MOB_NBR-ADV message |
| Req_Seq_Num | 1 | One-bit sequence number of the message associated with each new message |
| Scanning_type | 1 | 0b000: non-association scan; 0b001: stratum 0 association scan; 0b010: stratum 1 association scan; 0b011: stratum 2 association scan; 0b100-0b111: reserved |
| } } | — | — |
| N_Recommended_BS_Index | 8 | When its value is not equal to 0xFF, it is the number of the base stations recommended in the MOB_NBR-ADV message, and when its value is equal to 0xFF, (BS_Bittnap_Index) is used to identify the base station index in the MOB_NBR-ADV message. |
| ... | ... | ... |
| } | — | — |

Step 3: after the serving base station receives the MOB_SCN-REQ message carrying the scan request signaling from the terminal, the serving base station determines whether the terminal can start to scan the carriers of the neighboring base station according to the service currently performed by the terminal and/or the scheduling algorithm within the base station. Specifically, if the serving base station authorizes a scan interval (i.e. scan duration) as long as the requested period to the terminal, the terminal then can start to scan the carriers of the neighboring base station, and if the scan duration authorized by the serving base station to the terminal is 0, it means the serving base station refuses the neighboring base station carrier scan request of the terminal.

Step 4, when determining that the terminal can start to scan the carriers of the neighboring base station, the serving base station sends the scan response message to the terminal. Specifically, the scan response message sent from the serving base station to the terminal can be included in the MOB_SCN-RSP message. This message can be sent through a basic connection identifier (BASIC CID). Table 10 shows the message format of the MOB_SCN-RSP message supporting multi-carriers. As shown in Table 10, the message can be added with the following parameters: 1, whether the carrier index bitmap in the MOB_NBR-ADV message is used (Use_SMC_Bitmap_Index); 2, whether the carrier index bitmap in the MOB_SCN-REQ message is used (Use_ReqSMC_Bitmap_Index); 3, the configuration change count in the MOB_NBR-ADV message (Configuration change count for MOB_SMC-ADV); 4, the size of the bitmap index in the MOB_NBR-ADV message (SMC_Bitmap_Size); 5, whether corresponding carrier in the MOB_SCN-REQ message is recommended (SMC_Bitmap_Index); 6, the number of the recommended carriers (N_Recommended_SMC_Index); 7, the carrier index in the MOB_NBR-ADV message (SMC_Index); 8, the number of the recommended serving carriers using 48-bit identification (ID) (N_Recommended_SMC_Full); and 9, the recommended carrier ID (Recommended SMC ID).

TABLE 10

| Syntax | Size (bit) | Notes |
|---|---|---|
| MOB_SCN-RSP_Message_format( ) { | — | — |
| ... | ... | ... |
| Rsp_Seq_Num | 1 | — |
| Use_SMC_Bitmap_Index | 8 | 0: the carrier index bitmap in the MOB_NBR-ADV message is not used. 1: the carrier index bitmap in the MOB_NBR-ADV message is used. |
| Use_ReqSMC_Bitmap_Index | 8 | 0: the carrier index bitmap in the MOB_SCN-REQ message is not used. 1: the carrier index bitmap in the MOB_SCN-REQ message is used. |
| Use_Nbr_Bitmap_Index | 1 | — |
| ... | ... | ... |
| if (Scan Duration != 0) { | — | — |
| ... | ... | ... |
| Scan iteration | 8 | — |
| If( Use_SMC_Bitmap_index == 1){ | — | — |
| Configuration change count for MOB_SMC-ADV | 8 | — |
| SMC_Bitmap_Size | 6 | — |
| SMC_Bitmap_Index | 8 | 0: corresponding carrier is not used. 1: corresponding carrier is used. |
| for( each '1' in SMC_Bitmap_Index ){ | — | — |
| ... | ... | ... |
| } else { | — | — |
| N_Recommended_SMC_Index | 8 | Scan the carrier list in the MOB_NBR-ADV message when it is 0 |
| If(N_Recommended_SMC_Index != 0) { | — | — |
| Configuration change count for MOB_SMC-ADV | 8 | — |
| } | | |
| for(j = 0; j < N_Recommended_SMC_Index ; j++){ | — | |
| SMC_Index | 8 | |
| ... | ... | ... |
| } | — | — |
| If( Use_ReqSMC_Bitmap_Index == 1 ) | — | — |
| ... | ... | ... |
| } | — | — |
| N_Recommended_SMC_Full | 8 | — |
| For(j = 0; j < N_Recommended_SMC_Full; j++){ | — | — |
| Recommended SMC ID | 48 | |
| ... | ... | ... |
| } | — | — |
| } | — | — |
| if (Scan Duration != 0) { | — | — |
| ... | ... | ... |
| } | — | — |
| } | — | — |
| Padding | — | |
| ... | ... | ... |
| } | — | — |

Step 5, when receiving the scan response in which the scan duration is not 0 from the serving base station, the terminal starts to scan the carriers of the neighboring base station and determines whether to send the multi-carrier scan report and how to send the above scan report according to the parameters in the scan response (corresponding to the step S104 in FIG. 1). Specifically, when Report mode=0b00 in the scan response message, it means the terminal does not need to send the scan report; when Report mode=0b01, it means the scan report needs to be sent periodically; when Report mode=0b10, it means the event initiation report needs to be sent (as long as the initiation condition is met); and when Report mode=0b11, it means the scan report only needs to be sent once.

In addition, the multi-carrier scan report for the neighboring base station from the terminal can be included in the MOB_SCN-REP message which is sent through the key management connection identifier (CID). Table 11 shows the message format of the MOB_SCN-REP message supporting multi-carriers. As shown in Table 11, this message includes all information of the serving base station multi-carriers inquired in the MOB_SCN-REQ message. Specifically, this message can be added with the following parameters: 1, the number of the existing multi-carriers in the current neighboring base station (N_current_SMCs); 2, whether the carrier index bitmap in the MOB_NBR-ADV message is used (Use_SMC_Bitmap_Index); 3, whether the carrier index bitmap in the MOB_SCN-RSP message is used (Use_RspSMC_Bitmap_Index); 4, SMC_Bitmap_Index; 5, RspSMC_Bitmap_Index; 6, the size of RspSMC_Bitmap_Index (RspSMC_Bitmap_Size); 7, the neighboring base station temporary multi-carrier ID (Temp SMCID); 8, the configuration change count in the MOB_NBR-ADV message (Configuration change count for MOB_SMC-ADV); 9, the size of Use_SMC_Bitmap_Index (SMC_Bitmap_Size); 10, whether the corresponding carrier is recommended (SMC_Bitmap_Index); 11, the number of carriers (N_SMC_Index); 12, the carrier index in the MOB_NBR-ADV message (SMC_Index); 13, the number of the recommended serving carriers using 48-bit ID (N_SMC_Full); 14, the recommended carrier ID (SMC ID); and 15, the carrier index bitmap in the MOB_SCN-RSP message (RspSMC_Bitmap_Index).

TABLE 11

| Syntax | Size (bit) | Notes |
|---|---|---|
| MOB_SCN-REP_Message_format( ) { | — | — |
| . . . | . . . | . . . |
| Report Mode | 1 | — |
| N_current_SMCs | | |
| Use_SMC_Bitmap_Index | 8 | 0: the carrier index bitmap in the MOB_NBR-ADV message is not used. 1: the carrier index bitmap in the MOB_NBR-ADV message is used. |
| Use_RspSMC_Bitmap_Index | 8 | 0: the carrier index bitmap in the MOB_SCN-REQ message is not used. 1: the carrier index bitmap in the MOB_SCN-REQ message is used. |
| . . . | . . . | . . . |
| Report metric | 8 | On which type of metric the triggering is based: Bit 0: SMC CINR mean; Bit 1: SMC RSSI mean; Bit 2: Relative delay Bit 3: SMC RTD; merely measured between the serving carrier and the terminal; Bits 4-7: reserved and set to be 0 |
| For (j = 0; j < N_current_SMCs; j++) { | — | — |
| Temp SMCID | 4 | — |
| If (Report metric [Bit 0] == 1) | — | — |
| SMC CINR mean | 8 | — |
| If (Report metric[Bit 1] == 1) | — | — |
| SMC RSSI mean | 8 | — |
| If ((Report metric[Bit 2] == 1) and (Temp SMCID == anchor SMC) ) | — | — |
| Relative delay | 8 | — |
| If ((Report metric[Bit 3] == 1) and ((Temp SMCID == anchor SMC) or (Temp SMCID == serving SMC))) | — | — |
| SMC RTD | 8 | — |
| } | — | — |
| If( Use_SMC_Bitmap_Index == 1){ | — | — |
| Configuration change count for MOB_SMC-ADV | 8 | — |
| SMC_Bitmap_Size | 6 | — |
| SMC_Bitmap_Index | 8 | 0: corresponding carrier is not used. 1: corresponding carrier is used. |
| for( each '1' in SMC_Bitmap_Index ){ | — | — |
| If (Report metric[Bit 0] == 1) | — | — |
| SMC CINR mean | 8 | — |
| If (Report metric[Bit 1] == 1) | — | — |
| SMC RSSI mean | 8 | — |
| If ((Report metric[Bit 2] == 1) Relative delay | 8 | — |
| } | — | — |
| } else { | — | — |
| N_SMC_Index | 8 | The number of carriers in the MOB_NBR-ADV message |
| If(N_SMC_Index != 0){ | — | — |
| Configuration change count for MOB_SMC-ADV | 8 | — |
| } | | |
| for(j = 0; j < N_SMC_Index; j++){ | — | |
| SMC_Index | 8 | — |
| If (Report metric[Bit 0] == 1) | — | — |
| SMC CINR mean | 8 | — |

TABLE 11-continued

| Syntax | Size (bit) | Notes |
|---|---|---|
| If (Report metric[Bit 1] == 1) | — | — |
| SMC RSSI mean | 8 | — |
| If ((Report metric[Bit 2] == 1) | — | — |
| Relative delay | 8 | — |
| } | — | — |
| } | — | — |
| N_SMC_Full | 8 | — |
| For(j = 0; j < N_SMC_Full; j++){ | — | — |
| SMC ID | 48 | — |
| If (Report metric[Bit 0] == 1) | — | — |
| SMC CINR mean | 8 | — |
| If (Report metric[Bit 1] == 1) | — | — |
| SMC RSSI mean | 8 | — |
| If ((Report metric[Bit 2] == 1) | — | — |
| Relative delay | 8 | — |
| } | — | — |
| RspSMC_Bitmap_Size | 6 | — |
| RspSMC_Bitmap_index | (RspSMC_Bitmap_Size + 1) × 4 | — |
| for( each '1' in RspSMC_Bitmap_index){ | — | — |
| If (Report metric[Bit 0] == 1) | — | — |
| SMC CINR mean | 8 | — |
| If (Report metric[Bit 1] == 1) | — | — |
| SMC RSSI mean | 8 | — |
| If ((Report metric[Bit 2] == 1) | — | — |
| Relative delay | 8 | — |
| } | — | — |
| } | — | — |
| N_current_BSs | 3 | — |
| ... | ... | ... |
| } | — | — |
| } | — | — |
| Padding | variable | — |
| TLV encoded information | variable | ... |
| } | — | — |

It can be concluded from the above processes that the terminal is able to send the multi-carrier scan report of the neighboring base station to the base station through the MOB_SCN-REP message.

Example 4

Figure 5:
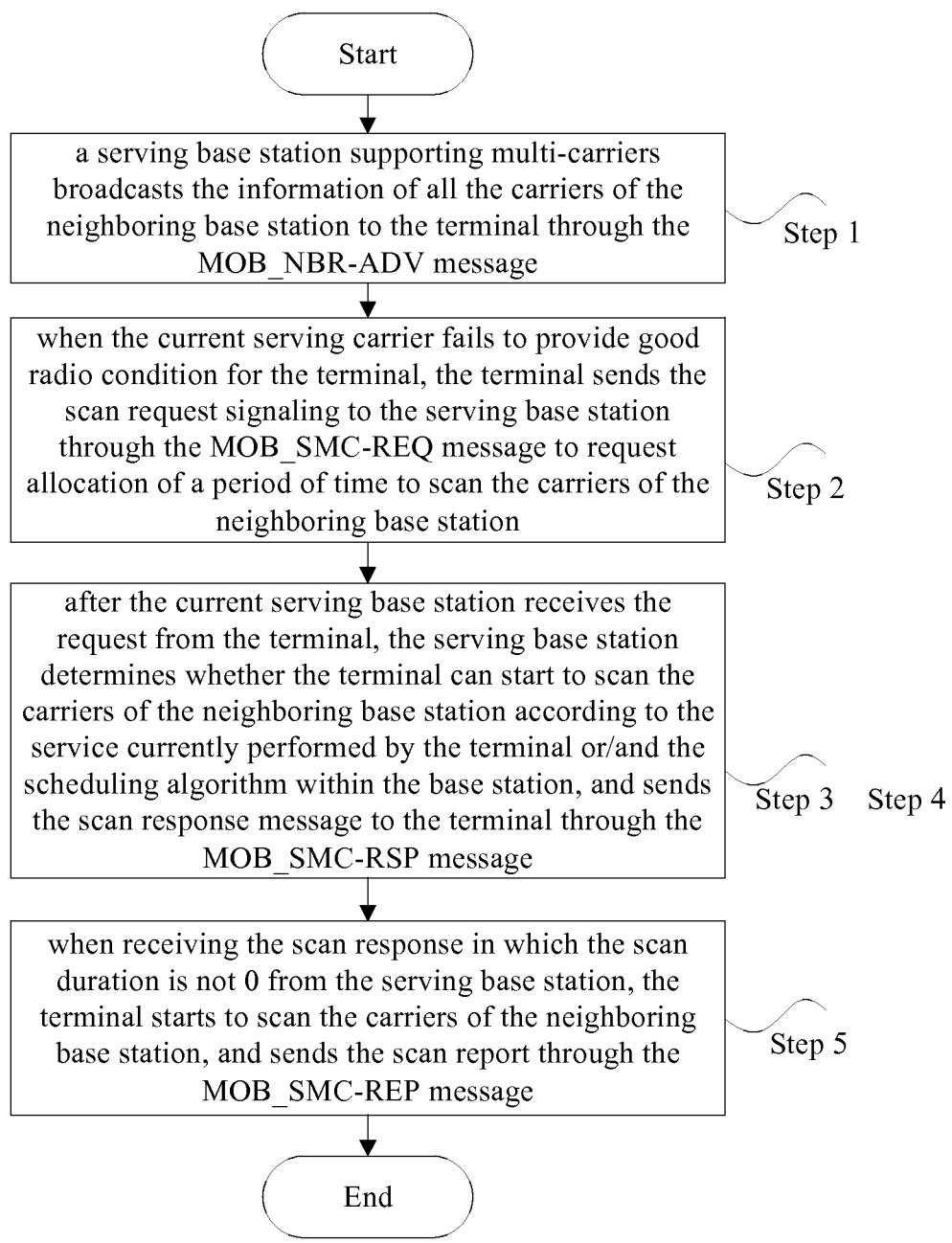
FIG. 5 is a flow chart of Example 4 according to an embodiment of the present invention.

In this example, the carrier information of a neighboring base station is broadcast by the base station to the terminal through the MOB_NBR-ADV message; a scan request signaling is sent from the terminal to the base station through the MOB_SMC-REQ message; a scan response message is sent from the base station to the terminal through the MOB_SMC-RSP message; and the scan report is sent from the terminal to the base station through the MOB_SMC-REP message. FIG. 5 is a flow chart of Example 4 according to an embodiment in the present invention. As shown in FIG. 5, the flow comprises the processes as follows.

Step 1, a serving base station supporting multi-carriers broadcasts the information of all carriers (the above-mentioned multi-carrier information) of its neighboring base station to the terminal. Specifically, the multi-carrier information of the neighboring base station can be carried in the MOB_NBR-ADV message. Table 8 shows the message format of the MOB_NBR-ADV message supporting multi-carriers. As shown in Table 8, the multi-carrier information in this message comprises but is not limited to the following parameters: the identification of the neighboring base station, preamble index/sub-channel index, an indication of whether it is a co-location, time and frequency synchronization indication, an indication of whether it is the fully-configured carrier, the number of the carriers included in the multi-carrier cell, carrier identification (SCID), carrier frequency (SCF) and carrier bandwidth (SCB).

Step 2, when the current serving carrier fails to provide good radio condition for the terminal, the terminal sends the scan request signaling to the serving base station to request allocation of a period of time to scan the carriers of the neighboring base station. Specifically, when the terminal sends the scan request signaling of scanning the carrier of the neighboring base station to the serving base station, the scan request can be sent through the newly added MOB_SMC-REQ message so as to request allocation of a scan interval, scan estimation time or recommended start frame. The MOB_SMC-REQ message is a new message. Table 12 shows the message format of the MOB_SMC-REQ message supporting multi-carriers. As shown in Table 12, the following parameters can be carried in the MOB_SMC-REQ message: 1, Scan duration; 2, Interleaving interval; 3, Scan Iteration; 4, the number index of the recommended neighboring base station carriers (N_Recommended_SMC_Index), wherein when the value of N_Recommended_SMC_Index is equal to 0xFF, it means the bitmap index of the neighboring base station carriers (SMC_Bitmap_Index) needs to be used to identify the neighboring base station carver index in the MOB_NBR-ADV message, and when the value of N_Recommended_SMC_Index is not equal to 0xFF, it represents that the number of recommended carriers in the MOB_NBR-ADV message is recommended; 5, the bitmap size of the neighboring base station carriers (SMC_Bitmap_Size), for representing the size of the bitmap index of the fully-configured carriers of the neighboring base station; 6, the bitmap index of the neighboring base station carriers (SMC_Bitmap_Index), for representing the bitmap index of the fully-configured carriers of the neighboring base station; and 7, the index of the neighboring base station carriers (SMC_BS_Index), for representing the location index of the neighboring base station carriers in the MOB_NBR-ADV message.

TABLE 12

| Syntax | Size (bit) | Notes |
|---|---|---|
| MOB_SMC-ADV_Message_format( ) { | — | — |
| Scan duration | 8 | — |
| Interleaving interval | 8 | — |
| Scan Iteration | 8 | — |
| N_Recommended_SMC_Index | 8 | When its value is not equal to 0xFF, it is the number of carriers recommended in the MOB_NBR-ADV message, and when its value is equal to 0xFF, (SMC_Bitmap_Index) is used to identify the neighboring base station carrier index in the MOB_NBR-ADV message. |
| If(N_Recommended_SMC_Index != 0) { | | |
| Configuration Change Count for MOB_ SMC -ADV message | 8 | |
| } | | |
| If(N_Recommended_SMC_Index == 0xFF){ | — | — |
| Reserved | 1 | Can be set to be 0 |
| Req_Seq_Num | 1 | One-bit sequence number of the message associated with each new message |
| SMC_Bitmap_Size | 6 | This size is smaller than or equal to the number of the neighboring base station carriers in the MOB_NBR-ADV message |
| SMC_Bitmap_Index | (SMC_Bitmap_Size + 1) × 4 | 0: corresponding multi-carrier is not requested. 1: corresponding multi-carrier is requested. |
| for( each '1' in Nbr_Bitmap_Index){ | — | — |
| Reserved | 1 | Can be set to be 0 |
| Scanning_type | 1 | 0b000: non-association scan; 0b001: stratum 0 association scan; 0b010: stratum 1 association scan; 0b011: stratum 2 association scan; 0b100-0b111: reserved |
| } | — | — |
| } else { | — | — |
| for(j = 0; j < N_Recommended_SMC_Index; j++){ | — | — |
| SMC_BS_Index | 8 | Corresponding location index of the serving base station carriers in the MOB_NBR-ADV message |
| Req_Seq_Num | 1 | One-bit sequence number of the message associated with each new message |
| Scanning_type | 1 | 0b000: non-association scan; 0b001: stratum 0 association scan; 0b010: stratum 1 association scan; 0b011: stratum 2 association scan; 0b100-0b111: reserved |
| } | | |
| } | — | — |
| } | — | — |

Step 3: after the current serving base station receives the MOB_SMC-REQ message carrying the scan request signaling from the terminal, the serving base station determines whether the terminal can start to scan the carriers of the neighboring base station according to the service currently performed by the terminal and/or the scheduling algorithm within the base station. Specifically, if the serving base station authorizes a scan interval (i.e. scan duration) as long as the requested period to the terminal, the terminal then can start to scan the carriers of the neighboring base station, and if the scan duration authorized by the serving base station to the terminal is 0, it means the serving base station refuses the neighboring base station carrier scan request of the terminal.

Step 4, when determining that the terminal can start to scan the carriers of the neighboring base station, the serving base station sends the scan response message to the terminal. Specifically, the response of the serving base station to the multi-carrier scan request from the terminal can be included in the new message MOB_SMC-RSP. This message is sent through the BASIC CID. Table 13 shows the message format of the MOB_SMC-RSP message supporting multi-carriers. As shown in FIG. 13, the message can be added with the following parameters: 1, Scan duration; 2, Report mode; 3, Report period; 4, Report metric; 5, scanning type (Scanning_type); 6, whether the carrier index bitmap in the MOB_NBR-ADV message is used (Use_SMC_Bitmap_Index); 7, whether the carrier index bitmap in the MOB_SMC-REQ message is used (Use_ReqSMC_Bitmap_Index); 8, the configuration change count in the MOB_NBR-ADV message (Configuration change count for MOB_SMC-ADV); 9, the size of the bitmap index in the MOB_NBR-ADV message (SMC_Bitmap_Size); 10, whether corresponding carrier is recommended (SMC_Bitmap_Index); 11, the number of the recommended carriers (N_Recommended_SMC_Index); 12, the carrier index in the MOB_NBR-ADV message (SMC_Index); 13, the number of the recommended serving carriers using 48-bit identification (ID) (N_Recommended_SMC_Full); and 14, the recommended carrier ID (Recommended SMC ID).

TABLE 13

| Syntax | Size (bit) | Notes |
|---|---|---|
| MOB_SMC-RSP_Message_format( ) { | — | — |
| Scan duration | 8 | — |
| Report mode | 2 | 0b00; no report; 0b01: periodical report; 0b10: event initiation report; 0b11: scan once |
| Rsp_Seq_Num | 1 | — |
| Use_SMC_Bitmap_Index | 8 | 0: the carrier index bitmap in the MOB_NBR-ADV message is not used. 1: the carrier index bitmap in the MOB_NBR-ADV message is used. |
| Use_ReqSMC_Bitmap_Index | 8 | 0: the carrier index bitmap in the MOB_SMC-REQ message is not used. 1: the carrier index bitmap in the MOB_SCN-REQ message is used. |
| Report period | 1 | When "Report mode" is 0b01 or 0b11, it is meaningful; otherwise, it is 0. |
| Report metric | 8 | On which type of metric the triggering is based: Bit 0: SMC CINR mean; Bit 1: SMC RSSI mean; Bit 2: Relative Delay; Bit 3: SMC RTD, merely measured between the serving carrier and the report terminal; Bits 4-7: reserved and set to be 0 |
| if (Scan Duration != 0) { | — | — |
| Start frame | 8 | — |
| Interleaving interval | 8 | — |
| Scan iteration | 8 | — |
| If( Use_SMC_Bitmap_Index == 1){ | — | — |
| Configuration change count for MOB_SMC-ADV | 8 | — |
| SMC_Bitmap_Size | 6 | — |
| SMC_Bitmap_Index | 8 | 0: corresponding carrier is not used. 1: corresponding carrier is used. |
| for( each '1' in SMC_Bitmap_Index ){ | — | — |
| Scanning_type | 3 | 0b001: scan with a band association level 0: 0b010: scan with a band association level 1: 0b011: scan with a band association level 2: 0b100-0b111: reserved |
| ... | ... | ... |
| } else { | — | — |
| N_Recommended_SMC_Index | 8 | Scan the carrier list in the MOB_NBR-ADV message when it is 0 |
| If(N_Recommended_SMC_Index != 0){ | — | — |
| Configuration change count for MOB_SMC-ADV } | 8 | — |
| for(j = 0; j < N_Recommended_SMC_Index; j++){ | — | — |
| SMC_Index | 8 | — |
| ... | ... | ... |
| } | — | — |
| If( Use_ReqSMC_Bitmap_Index == 1 ) | — | — |
| ... | ... | ... |
| } | — | — |
| N_Recommended_SMC_Full | 8 | — |
| For(j = 0; j < N_Recommended_SMC_Full; j++){ | — | — |
| Recommended SMC ID | 48 | — |
| ... | ... | ... |
| TLV encoded information } | — | — |

Step 5, when receiving the scan response in which the scan duration is not 0 from the serving base station, the terminal starts to scan the carriers of the neighboring base station and determines whether to send the multi-carrier scan report and how to send the above scan report according to the parameters in the scan response. Specifically, when Report mode-0b00 in the scan response message, it means the terminal does not need to send the scan report; when Report mode=0b01, it means the scan report needs to be sent periodically; when Report mode=0b10, it means the event initiation report needs to be sent (as long as the initiation condition is met); and when Report mode=0b11, it means the scan report only needs to be sent once.

In addition, the multi-carrier scan report for the neighboring base station from the terminal can be included in the new message MOB_SMC-REP message which is sent through the key management CID. Table 14 shows the message format of the MOB_SMC-REP message supporting multi-carriers.

This message includes all information of the serving base station multi-carriers inquired in the MOB_SCN-REQ message. Specifically, this message can be provided with the following parameters: 1, the carrier-to-noise mean of the neighboring base station carrier (SMC CINR mean); 2, the received signal strength indicator mean of the neighboring base station (SMC RSSI mean); 3, Relative delay; 4, return delay between the scan terminal and the carriers (SMC RTD); 5, the number of the existing multi-carriers in the neighboring base station (N_current_SMCs); 6, whether the carrier index bitmap in the MOB_NBR-ADV message is used (Use_SMC_Bitmap_Index); 7, whether the carrier index bitmap in the MOB_SCN-RSP message is used (Use_RspSMC_Bitmap_Index); 8, SMC_Bitmap_Index; 9, RspSMC_Bitmap_Index; 10, the size of RspSMC_Bitmap_Index (RspSMC_Bitmap_Size); 11, the neighboring base station temporary multi-carrier ID (Temp SMCID); 12, the configuration change count in the MOB_NBR-ADV message (Configuration change count for MOB_SMC-ADV); 13, the size of Use_SMC_Bitmap_Index (SMC_Bitmap_Size); 14, whether the corresponding carrier is recommended (SMC_Bitmap_Index); 15, the number of carriers (N_SMC_Index); 16, the carrier index in the MOB_NBR-ADV message (SMC_Index); 17, the number of the recommended serving carriers using 48-bit ID (N_SMC_Full); 18, the recommended carrier ID (SMC ID); and 19, the carrier index bitmap in the MOB_SCN-RSP message (RspSMC_Bitmap_Index).

TABLE 14

| Syntax | Size (bit) | Notes |
|---|---|---|
| MOB_SMC-REP_Message_format( ) { | — | — |
| Report Mode | 1 | — |
| N_current_SMCs | | |
| Use_SMC_Bitmap_Index | 8 | 0: the carrier index bitmap in the MOB_NBR-ADV message is not used. 1: the carrier index bitmap in the MOB_NBR-ADV message is used. |
| Use_RspSMC_Bitmap_Index | 8 | 0: the carrier index bitmap in the MOB_SCN-REQ message is not used. 1: the carrier index bitmap in the MOB_SCN-REQ message is used. |
| ... | ... | ... |
| Report metric | 8 | On which type of metric the triggering is based: Bit 0: SMC CINR mean; Bit 1: SMC RSSI mean; Bit 2: Relative delay Bit 3: SMC RTD; merely measured between the serving carrier and the terminal; Bits 4-7: reserved and set to be 0 |
| For (j = 0; j < N_current_SMCs; j++) { | — | — |
| Temp SMCID | 4 | — |
| If (Report metric[Bit 0] == 1) | — | — |
| SMC CINR mean | 8 | — |
| If (Report metric[Bit 1] == 1) | — | — |
| SMC RSSI mean | 8 | — |
| If ((Report metric[Bit 2] == 1) and (Temp SMCID == anchor SMC) ) | — | — |
| Relative delay | 8 | — |
| If ((Report metric[Bit 3] == 1) and ((Temp SMCID == anchor SMC) or (Temp SMCID == serving SMC))) | — | — |
| SMC RTD | 8 | — |
| } | — | — |
| If( Use_SMC_Bitmap_Index == 1){ | — | — |
| Configuration change count for MOB_SMC-ADV | 8 | — |
| SMC_Bitmap_Size | 6 | — |
| SMC_Bitmap_Index | 8 | 0: corresponding carrier is not used. 1: corresponding carrier is used. |
| for( each '1' in SMC_Bitmap_Index ){ | — | — |
| If (Report metric[Bit 0] == 1) | — | — |
| SMC CINR mean | 8 | — |
| If (Report metric[Bit 1] == 1) | — | — |
| SMC RSSI mean | 8 | — |
| If ((Report metric[Bit 2] == 1) | — | — |
| Relative delay | 8 | — |
| } | — | — |
| } else { | — | — |
| N_SMC_Index | 8 | The number of carriers in the MOB_NBR-ADV message |
| If(N_SMC_Index != 0){ | — | — |
| Configuration change count for MOB_SMC-ADV | 8 | — |
| } | | |
| for(j = 0; j < N_SMC_Index; j++){ | — | — |
| SMC_Index | 8 | — |
| If (Report metric[Bit 0] == 1) | — | — |

TABLE 14-continued

| Syntax | Size (bit) | Notes |
|---|---|---|
| SMC CINR_mean | 8 | — |
| If (Report metric[Bit 1] == 1) | — | — |
| SMC RSSI_mean | 8 | — |
| If ((Report metric[Bit 2] == 1) | — | — |
| Relative delay | 8 | — |
| } | — | — |
| } | — | — |
| N_SMC_Full | 8 | — |
| For(j = 0; j < N_SMC_Full; j++){ | — | — |
| SMC ID | 48 | — |
| If (Report metric[Bit 0] == 1) | — | — |
| SMC CINR_mean | 8 | — |
| If (Report metric[Bit 1] == 1) | — | — |
| SMC RSSI_mean | 8 | — |
| If ((Report metric[Bit 2] == 1) | — | — |
| Relative delay | 8 | — |
| } | — | — |
| RspSMC_Bitmap_Size | 6 | — |
| RspSMC_Bitmap_index | (RspSMC_Bitmap_Size + 1) × 4 | — |
| for( each '1' in RspSMC_Bitmap_index){ | — | — |
| If (Report metric[Bit 0] == 1) | — | — |
| SMC CINR_mean | 8 | — |
| If (Report metric[Bit 1] == 1) | — | — |
| SMC RSSI_mean | 8 | — |
| If ((Report metric[Bit 2] == 1) | — | — |
| Relative delay | 8 | — |
| } | — | — |
| } | — | — |
| Padding | variable | — |
| TLV encoded information | variable | ... |
| } | — | — |

It can be concluded from the above processes that the terminal is able to send the multi-carrier scan report of the neighboring base station to the base station through the MOB_SMC-REP message.

According to the embodiments of the present invention, a computer readable medium is further provided. This computer readable medium is stored with computer executable commands. When the commands are executed by a computer or a processor, the computer or processor is made to execute the process of each step as shown in FIG. 1 to FIG. 5. Preferably, one or a plurality of the above examples can be carried out.

Apparatus Embodiments

According to an embodiment of the present invention, a terminal is provided. FIG. 6 is a block diagram of the terminal according to an embodiment of the present invention. As shown in FIG. 6, the terminal comprises an acquiring module 60, a scanning module 62 and a sending module 64. In order to describe the terminal more clearly, the related operations at the base station side will be firstly explained.

At the base station side, the base station firstly determines the indicated carrier(s) (or called recommended carrier(s)) that the terminal needs to scan, wherein the indicated carrier(s) can be either the carrier(s) of the current base station or the carrier(s) of a neighboring multi-carrier base station; after the indicated carrier(s) is determined, the base station sets the first configuration parameter of the indicated carrier(s), preferably, the indicated carrier(s) can be fully-configured carrier(s); in addition, the base station also needs to set the second configuration parameter needed for the terminal to send the scan report; after both the first configuration parameter and the second configuration parameter are set, the base station sends the first configuration parameter and the second configuration parameter to the acquiring module 60 of the terminal.

It should be indicated that the first configuration parameter can comprise at least one of the following: the identification(s) of the indicated carrier(s), the frequency(s) of the indicated carrier(s) and the bandwidth(s) of the indicated carrier(s); and the second configuration parameter can comprise at least one of the following: the identification of whether to send the scan report and the mode of sending the scan report. It should be indicated that in practical application, the information included in the first configuration parameter and the second configuration parameter is not limited to the above contents.

Next, the modules in the above terminal will be described. Specifically, the acquiring module 60 acquires the first configuration parameter of the indicated carrier(s) and the second configuration parameter needed for the sending module 64 to send the scan report from the base station; after the acquiring module 60 acquires the above parameters, the scanning module 62 connected to the acquiring module 60 scans the indicated carrier(s) according to the first configuration parameter and generates the scan report; after the scan report is generated, the sending module 64 connected to the scanning module 62 and the acquiring module 60 will send the scan report to the base station according to the second configuration parameter. In the above, the scan report includes the information of the carrier(s) scanned by the scanning module 62, and the information of the scanned carrier(s) can include at least one of the following: the number of the scanned carrier(s), the identification(s) of the scanned carrier(s), the frequency(s) of the scanned carrier(s) and the bandwidth(s) of the scanned carrier(s).

It should be indicated that without departing from the spirit and scope illustrated in the attached claims, the above modules can be modified and combined.

To sum up, with the technical solutions of the present invention, by sending the scan reports to the base station after the terminal completes the scan, the problem that the terminal does not have corresponding solution for sending the scan report to the base station in the multi-carrier system is solved, therefore, the terminal can timely send the scan report to the base station after the scan is completed.

In addition, the present invention is realized without modifying the system architecture or the current processing flow, is easy to be accomplished and popularized in the technical field and has strong industrial applicability.

Apparently, the person skilled in the art should know that each module or step in the present invention can be realized by the general calculating apparatus. They can be collected in a single calculating apparatus or distributed in the network formed by a plurality of calculating apparatus. Optionally, they can be realized by the program codes executable by the calculating apparatus, therefore, they can be stored in the storing apparatus to be executed by the calculating apparatus, or they can be fabricated into integrated circuit modules, respectively, or a plurality of modules or steps therein are fabricated into individual integrated circuit module for the accomplishment. Thus, the present invention is not limited to the combination of any particular hardware and software.

Above description is only to illustrate the preferable embodiments but not to limit the present invention. For those skilled in the art, the present invention may have various alterations and changes. The protection scope of the present invention shall comprise any modification, equivalent substitution and improvement within the spirit and principle of the present invention.

What is claimed is:

1. A method for sending a scan report based on a multi-carrier system, comprising:
   a terminal sending a scan request signaling to a base station;
   the terminal acquiring a first configuration parameter of carrier(s) indicated by the base station and a second configuration parameter needed for the terminal to send a scan report from a scan response message which the base station sends to the terminal in response to the scan request signaling, wherein the carrier(s) indicated by the base station is one of or a plurality of carriers of the base station and/or a neighboring base station of the base station; and
   the terminal scanning the carrier(s) indicated by the base station according to the first configuration parameter, generating a scan report, and sending the scan report to the base station according to the second configuration parameter.

2. The method according to claim 1, wherein the carrier(s) indicated by the base station is fully-configured carrier(s).

3. The method according to claim 1, before the terminal acquires the first configuration parameter and the second configuration parameter, the method further comprises:
   the base station determining the carrier(s) indicated by the base station that the terminal needs to scan;
   the base station setting the first configuration parameter of the carrier(s) indicated by the base station;
   the base station setting the second configuration parameter needed for the terminal to send the scan report; and
   the base station sending the first configuration parameter and the second configuration parameter to the terminal.

4. The method according to claim 1, wherein the first configuration parameter comprises at least one of the following: identification(s) of the carrier(s) indicated by the base station, frequency(s) of the carrier(s) indicated by the base station, and bandwidth(s) of the carrier(s) indicated by the base station.

5. The method according to claim 1, wherein the second configuration parameter comprises at least one of the following: an identification of whether to send the scan report, and a mode of sending the scan report.

6. The method according to claim 1, wherein the scan report comprises information of carrier(s) scanned by the terminal, wherein the information comprises at least one of the following: the number of the scanned carrier(s), identification(s) of the scanned carrier(s), frequency(s) of the scanned carriers, and bandwidth(s) of the scanned carrier(s).

7. A terminal, comprising:
   a sending module, configured to send a scan request signaling to a base station;
   an acquiring module, configured to acquire a first configuration parameter of carrier(s) indicated by the base station and a second configuration parameter needed for the terminal to send a scan report from a scan response message which the base station sends to the terminal in response to the scan request signaling, wherein the carrier(s) indicated by the base station is one of or a plurality of the carriers of the base station and/or a neighboring base station of the base station; and
   a scanning module, configured to scan the carrier(s) indicated by the base station according to the first configuration parameter and to generate a scan report;
   wherein the sending module is further configured to send the scan report to the base station according to the second configuration parameter.

8. The terminal according to claim 7, wherein the first configuration parameter comprises at least one of the following: identification(s) of the carrier(s) indicated by the base station, frequency(s) of the carrier(s) indicated by the base station, and bandwidth(s) of the carrier(s) indicated by the base station.

9. The terminal according to claim 7, wherein the second configuration parameter comprises at least one of the following: an identification of whether to send the scan report, and a mode of sending the scan report.

10. The terminal according to claim 7, wherein the scan report comprises information of carrier(s) scanned by the terminal, wherein the information comprises at least one of the following: the number of the scanned carrier(s), identification(s) of the scanned carrier(s), frequency(s) of the scanned carrier(s), and bandwidth(s) of the scanned carrier(s).

11. The method according to claim 2, wherein the first configuration parameter comprises at least one of the following: identification(s) of the carrier(s) indicated by the base station, frequency(s) of the carrier(s) indicated by the base station, and bandwidth(s) of the carrier(s) indicated by the base station.

12. The method according to claim 3, wherein the first configuration parameter comprises at least one of the following: identification(s) of the carrier(s) indicated by the base station, frequency(s) of the carrier(s) indicated by the base station, and bandwidth(s) of the carrier(s) indicated by the base station.

13. The method according to claim 2, wherein the second configuration parameter comprises at least one of the following: an identification of whether to send the scan report, and a mode of sending the scan report.

14. The method according to claim 3, wherein the second configuration parameter comprises at least one of the following: an identification of whether to send the scan report, and a mode of sending the scan report.

* * * * *